(12) United States Patent
Li et al.

(10) Patent No.: US 11,178,591 B2
(45) Date of Patent: Nov. 16, 2021

(54) RANGING-SPECIFIC MAC SERVICE AND PIB ATTRIBUTES FOR IEEE 802.15.4Z

(71) Applicant: Samsung Electronics Co., Ltd., Suwon-si (KR)

(72) Inventors: Zheda Li, Plano, TX (US); Aditya V. Padaki, Richardson, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 16/737,771

(22) Filed: Jan. 8, 2020

(65) Prior Publication Data

US 2020/0229068 A1 Jul. 16, 2020

Related U.S. Application Data

(60) Provisional application No. 62/877,094, filed on Jul. 22, 2019, provisional application No. 62/846,235, (Continued)

(51) Int. Cl.
*H04W 40/24* (2009.01)
*H04W 84/18* (2009.01)
(Continued)

(52) U.S. Cl.
CPC ......... *H04W 40/246* (2013.01); *H04L 1/1614* (2013.01); *H04L 5/0055* (2013.01); (Continued)

(58) Field of Classification Search
CPC ... H04W 40/246; H04W 8/005; H04W 48/16; H04W 64/003; H04W 84/12; (Continued)

(56) References Cited

U.S. PATENT DOCUMENTS 10,908,274 B2 * 2/2021 Li .................. H04L 1/1685
2015/0139213 A1 5/2015 Abraham et al.
(Continued)

OTHER PUBLICATIONS

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.
(Continued)

*Primary Examiner* — Michael J Moore, Jr.

(57) ABSTRACT

A network entity and a method of the network entity in a wireless communication system supporting ranging capability are provided. The network entity and the method comprise: identifying, by a higher layer of the network entity, a ranging reply time node list (RrtiNodeList) indicating a list of neighbor network entities for which ranging reply time instantaneous information elements (RRTI IEs) are requested along with receive ranging counter values; generating, by the higher layer of the network entity, a MCPS-DATA.request primitive including the RrtiNodeList; transmitting, to a MAC layer of the network entity, the generated MCPS-DATA.request primitive; and transmitting, to another network entity in the list of neighboring network entities, MAC data including ranging information, the RRTI, and ranging measurement information IEs (RMI IEs), wherein the MAC layer of the network entity is further configured to transmit, to the higher layer of the network entity, an MCPS-DATA.confirm primitive.

20 Claims, 23 Drawing Sheets

Related U.S. Application Data filed on May 10, 2019, provisional application No. 62/803,919, filed on Feb. 11, 2019, provisional application No. 62/791,365, filed on Jan. 11, 2019.

(51) Int. Cl.

| | | |
|---|---|---|
| *H04W 48/16* | (2009.01) | |
| *H04L 1/16* | (2006.01) | |
| *H04L 5/00* | (2006.01) | |
| *H04W 64/00* | (2009.01) | |
| *H04L 29/08* | (2006.01) | |
| *H04L 29/12* | (2006.01) | |
| *H04W 84/12* | (2009.01) | |
| *H04W 8/00* | (2009.01) | |

(52) U.S. Cl.
CPC ........ *H04L 61/6022* (2013.01); *H04L 69/323* (2013.01); *H04L 69/324* (2013.01); *H04W 8/005* (2013.01); *H04W 48/16* (2013.01); *H04W 64/003* (2013.01); *H04W 84/12* (2013.01); *H04W 84/18* (2013.01)

(58) Field of Classification Search
CPC .... H04W 84/18; H04L 1/1614; H04L 5/0055; H04L 61/6022; H04L 69/323; H04L 69/324
See application file for complete search history.

(56) References Cited

U.S. PATENT DOCUMENTS

| | | | | |
|---|---|---|---|---|
| 2015/0304943 | A1* | 10/2015 | Fong | H04W 48/16 |
| | | | | 370/329 |
| 2017/0127297 | A1* | 5/2017 | Stanescu | H04L 1/1671 |
| 2017/0339512 | A1* | 11/2017 | Wang | H04L 67/327 |
| 2018/0084537 | A1 | 3/2018 | Do et al. | |
| 2019/0020744 | A1* | 1/2019 | Dong | H04B 10/1149 |
| 2020/0182996 | A1* | 6/2020 | Lee | G01S 5/0284 |
| 2020/0183000 | A1* | 6/2020 | Li | G01S 13/878 |
| 2020/0200862 | A1* | 6/2020 | Li | G01S 5/0226 |
| 2020/0213842 | A1* | 7/2020 | Li | H04W 12/55 |
| 2020/0225341 | A1* | 7/2020 | Li | H04L 5/0055 |
| 2020/0228331 | A1* | 7/2020 | de Perthuis | H04L 9/16 |

OTHER PUBLICATIONS

"IEEE Standard for Low-Rate Wireless Networks", IEEE Computer Society, IEEE Std 802.15.4TM, Dec. 2015, 708 pages.
International Search Report in connection with International Application No. PCT/KR2020/000507 dated Apr. 29, 2020, 10 pages.
Jack Lee et al., "IEEE 802.15.4z MAC for Ranging," IEEE 15-18-0621-00-004z, Dec. 20, 2018, 67 pages.
Billy Verso, "Ranging procedures and messages," IEEE 15-18-0599-00-004z, Nov. 14, 2018, 25 pages.
Billy Verso, "Localisation elements for TG12 ULI," IEEE 15-17-0082-00-0012, Jan. 19, 2017, 15 pages.

* cited by examiner

RANGING-SPECIFIC MAC SERVICE AND PIB ATTRIBUTES FOR IEEE 802.15.4Z

CROSS-REFERENCE TO RELATED APPLICATIONS AND CLAIM OF PRIORITY

The present application claims priority to:
U.S. Provisional Patent Application Ser. No. 62/791,365 filed on Jan. 11, 2019;
U.S. Provisional Patent Application Ser. No. 62/803,919 filed on Feb. 11, 2019;
U.S. Provisional Patent Application Ser. No. 62/846,235 filed on May 10, 2019; and
U.S. Provisional Patent Application Ser. No. 62/877,094 filed on Jul. 22, 2019.
The content of the above-identified patent documents is incorporated herein by reference.

TECHNICAL FIELD

The present disclosure relates generally to a ranging operation in a wireless communication system. In particular, ranging-specific MAC service and PIB attributes in a wireless communication network is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide ranging-specific MAC service and PIB attributes in a wireless communication network.

In one embodiment, a network entity in a wireless communication system supporting ranging capability is provided. The network entity comprises a processor configured to: identify, by a higher layer of the network entity, a ranging reply time node list (RrtiNodeList) indicating a list of neighbor network entities for which ranging reply time instantaneous information elements (RRTI IEs) are requested along with receive ranging counter values; generate, by the higher layer of the network entity, a medium access control (MAC) common part sublayer (CPS) data request (MCPS-DATA.request) primitive including the RrtiNodeList; transmit, to a MAC layer of the network entity, the generated MCPS-DATA.request primitive. The network entity further comprises a transceiver operably connected to the processor, the transceiver configured to: transmit, to another network entity in the list of neighboring network entities, MAC data including ranging information, the RRTI, and ranging measurement information IEs (RMI IEs). The MAC layer of the network entity is further configured to transmit, to the higher layer of the network entity, an MCPS-DATA.confirm primitive.

In another embodiment, a method of a network entity in a wireless communication system supporting ranging capability is provided. The method comprises: identifying, by a higher layer of the network entity, a ranging reply time node list (RrtiNodeList) indicating a list of neighbor network entities for which ranging reply time instantaneous information elements (RRTI IEs) are requested along with receive ranging counter values; generating, by the higher layer of the network entity, a medium access control (MAC) common part sublayer (CPS) data request (MCPS-DATA.request) primitive including the RrtiNodeList; transmitting, to a MAC layer of the network entity, the generated MCPS-DATA.request primitive; and transmitting, to another network entity in the list of neighboring network entities, MAC data including ranging information, the RRTI, and ranging measurement information IEs (RMI IEs). The MAC layer of the network entity is further configured to transmit, to the higher layer of the network entity, an MCPS-DATA.confirm primitive.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 38, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
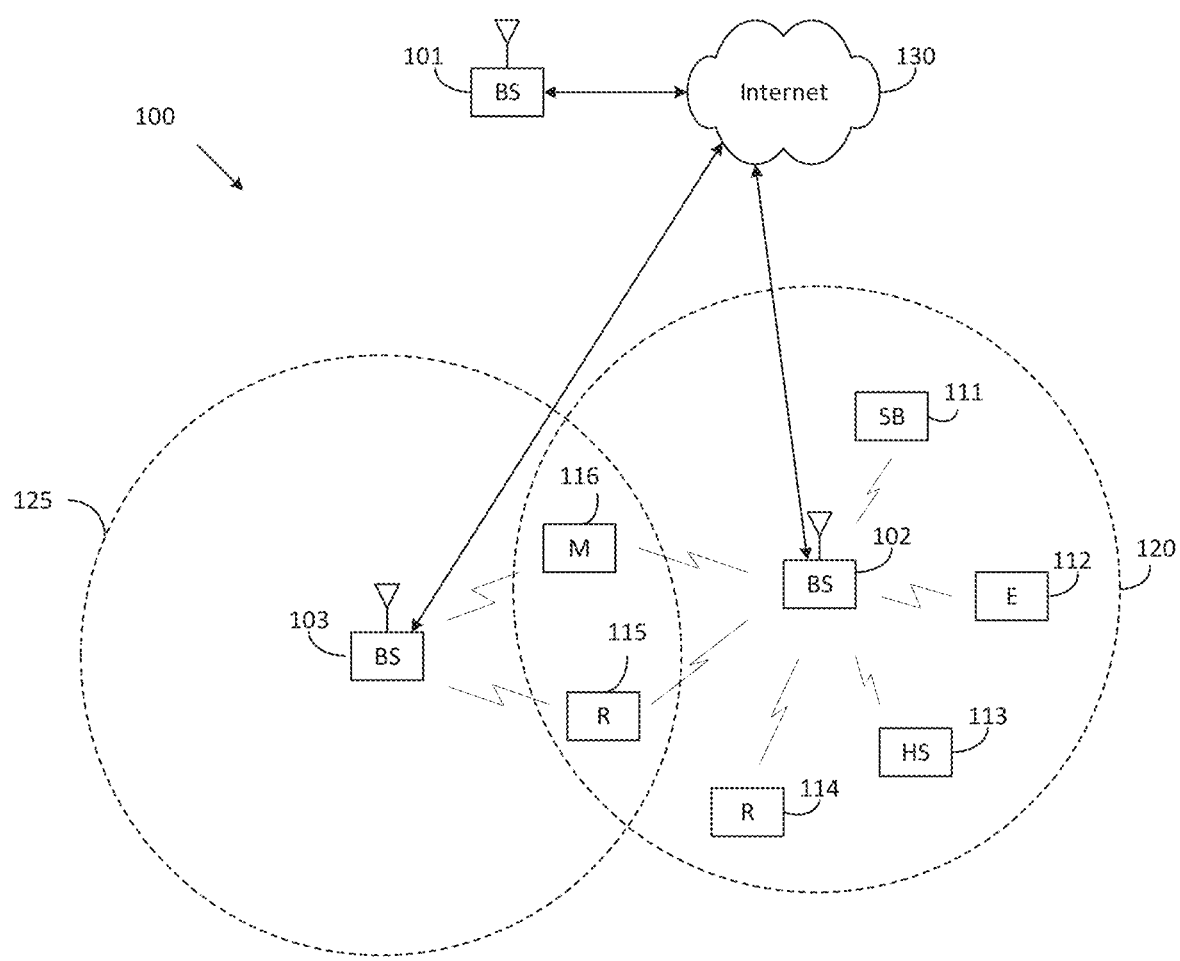
FIG. 1 illustrates an example wireless network according to embodiments of the present disclosure.
Figure 2:
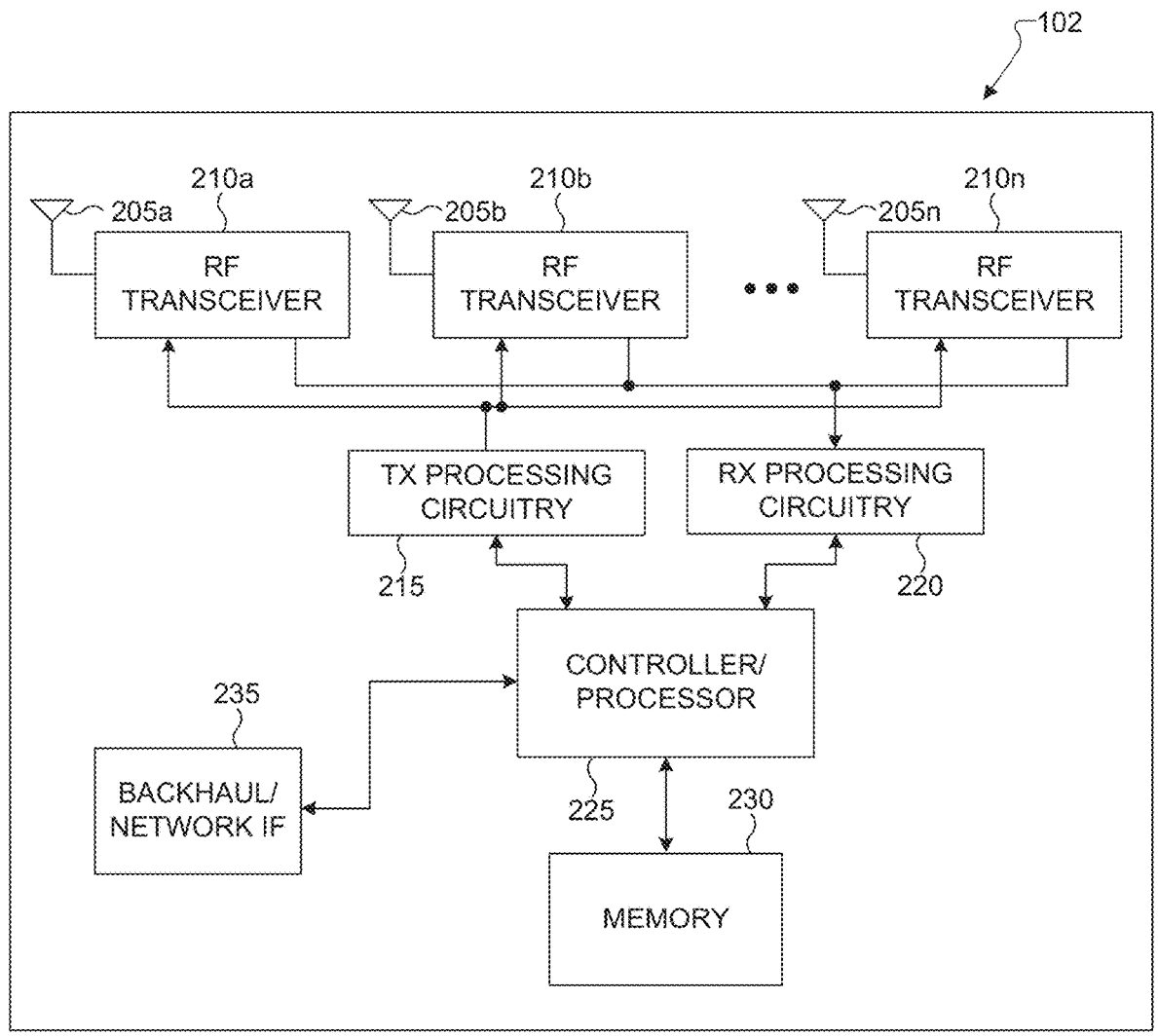
FIG. 2 illustrates an example gNB according to embodiments of the present disclosure.
Figure 3:
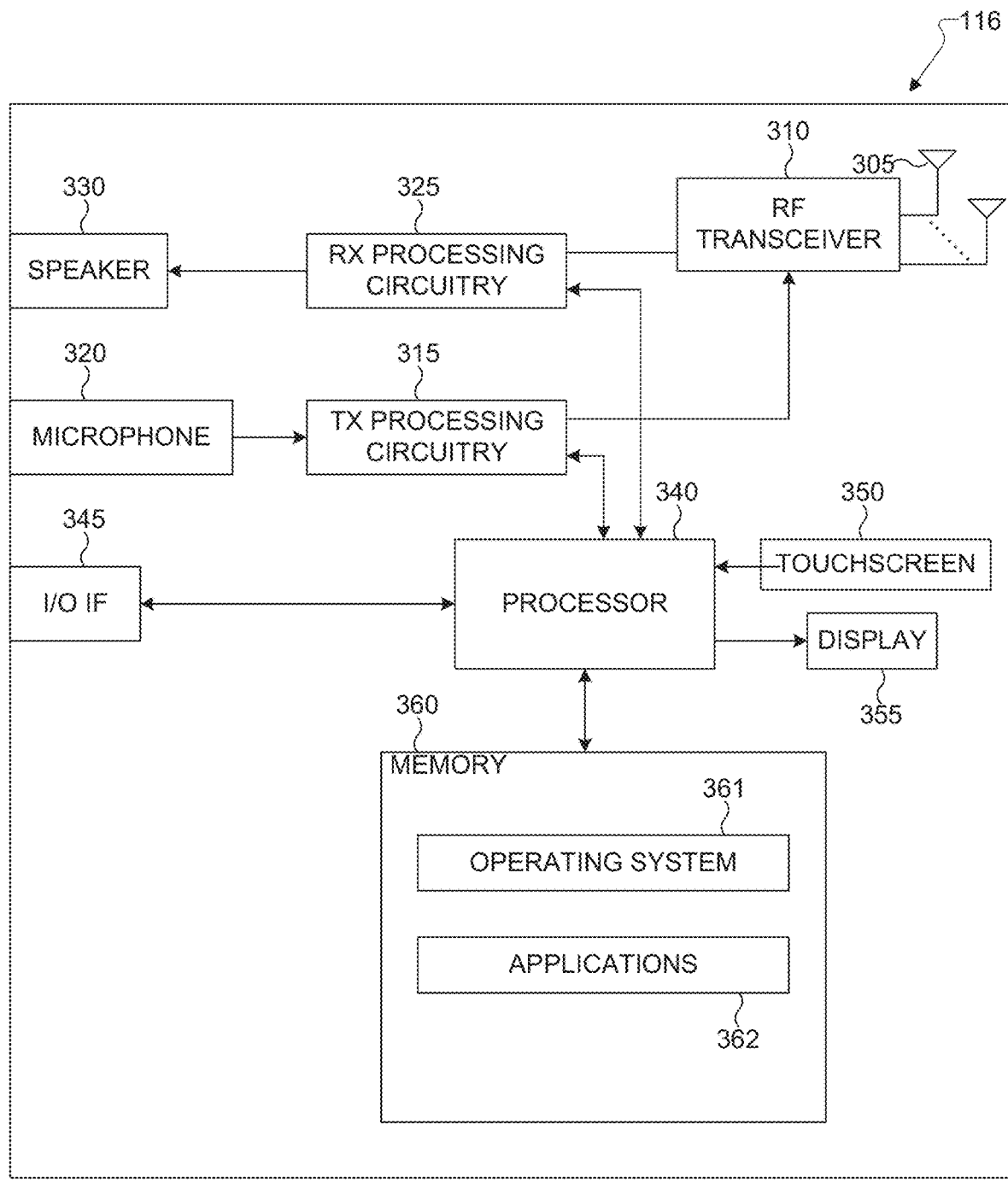
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for CSI reporting in an advanced wireless communication system. In certain embodiments, and one or more of the gNBs 101-103 includes circuitry, programing, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
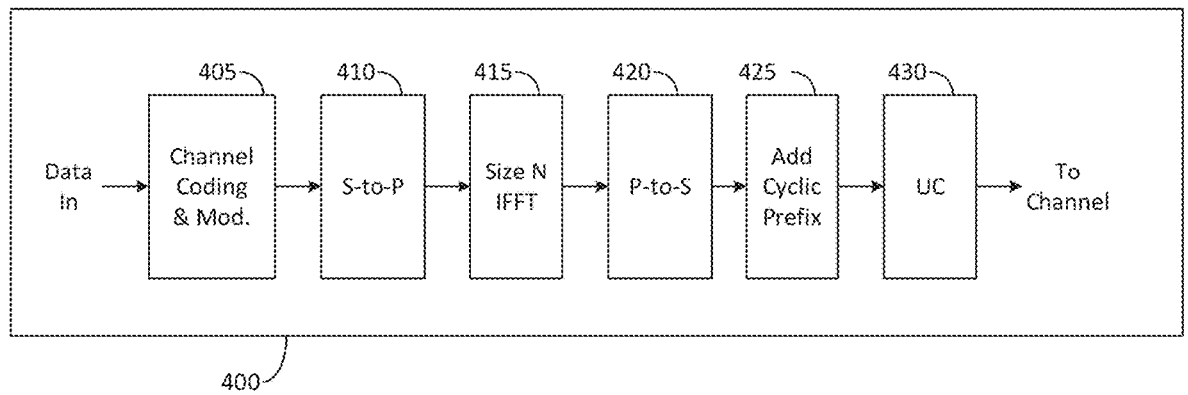
FIG. 4A illustrates a high-level diagram of an orthogonal frequency division multiple access transmit path according to embodiments of the present disclosure.
Figure 4B:
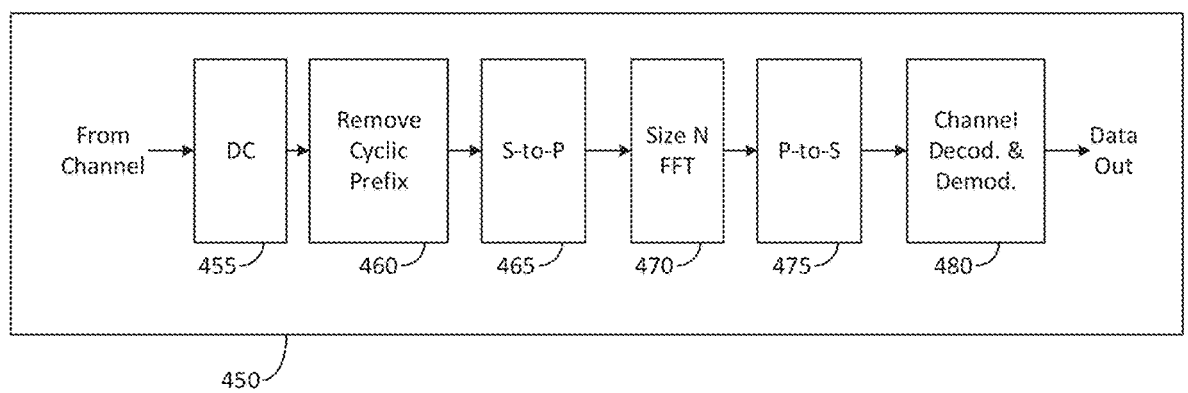
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
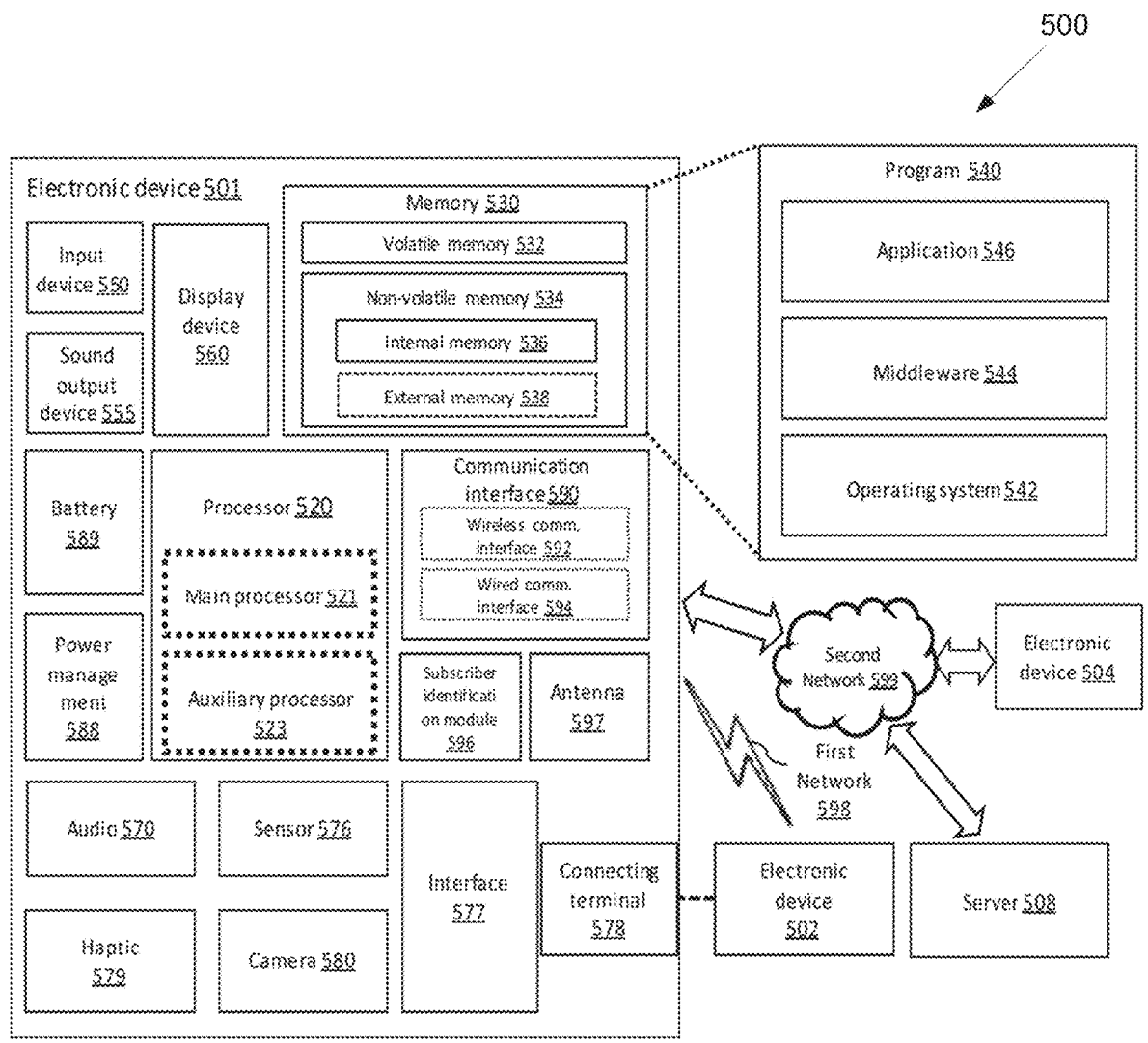
FIG. 5 illustrates an example electronic device according to embodiments of the present disclosure.

FIG. 5 illustrates an example electronic device 500 according to embodiments of the present disclosure. The embodiment of the electronic device 500 illustrated in FIG. 5 is for illustration only. FIG. 5 does not limit the scope of the present disclosure to any particular implementation. The electronic device 500 may be performed a function or functions of 111-116 as illustrated in FIG. 1. In one embodiment, the electronic device may be 111-116 and/or 101-103 as illustrated in FIG. 1.

PDs can be an electronic device. FIG. 5 illustrates an example electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor(e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill the scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Figure 6:
FIG. 6 illustrates an example many-to-many scenario according to embodiments of the present disclosure.
Figure 6:
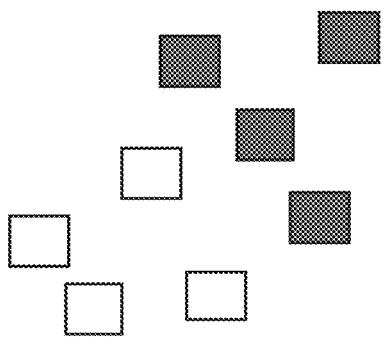

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation. As illustrated in FIG. 6, each node in group 1 and group 2 may performs a function or functions of 111-116 and 101-103 as illustrated in FIG. 1. In one embodiment, each node in group 1 and group 2 may be one of 111-116 and/or be one of 101-103 as illustrated in FIG. 1.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

There are two aspects neglected in IEEE standard specification, which are essential for future use cases. The first one is the optimized transmission procedure between one or more initiators and one or more responders, which can be critical for energy-saving purpose. Since a poll can be broadcast to multiple responders, an initiator can initialize a multicast, i.e., one-to-many, ranging round by sending a single poll instead of launching multiple unicast ranging rounds. Similarly, since the ranging response can also be broadcast to multiple initiators, a responder can embed the requested data respectively from different initiator in a single ranging response message. Exploiting the broadcast characteristics of wireless channel, the optimized transmission procedure is promising for future UWB network.

The other neglected aspect is the option for the contention-based ranging in an UWB network. In IEEE specification, one ranging round just contains a single pair of devices, i.e., one initiator and one responder. Within one ranging round, transmissions are implicitly scheduled: a responder/initiator expects to receive the message from the far end and may start to transmit afterwards. multiple ranging rounds can be scheduled by the CFP table of the sync frame. However, there can be other use cases that cannot be supported by IEEE standard specification. For example, the initiator broadcasts the poll, but it does not have the prior-knowledge of who may response. Similarly, the responder may not have the prior-knowledge of who may initialize the ranging, so it can wait and listen for a certain period of time to collect polls respectively from different initiators.

In the present disclosure, an UWB network is provided with ranging requests between a group of devices and another group of devices. As shown in FIG. 6, one or more devices of group-1 has the ranging request to one or more devices of group-2 or vice versa. To accommodate optimized ranging transmission procedure and other new use cases, the configuration of device role, i.e., whether the configuration of device is an initiator or a responder, and the scheduling information for scheduling-based ranging, need to be determined and exchanged before the ranging round starts. Aiming to build a stand-alone UWB network, the present disclosure defines new control IE, and ranging scheduling IE for initiators and responders, which can be exchanged over the UWB MAC. However, the present disclosure does not preclude other methods to exchange information via the higher layer or out-of-band management.

Figure 7:
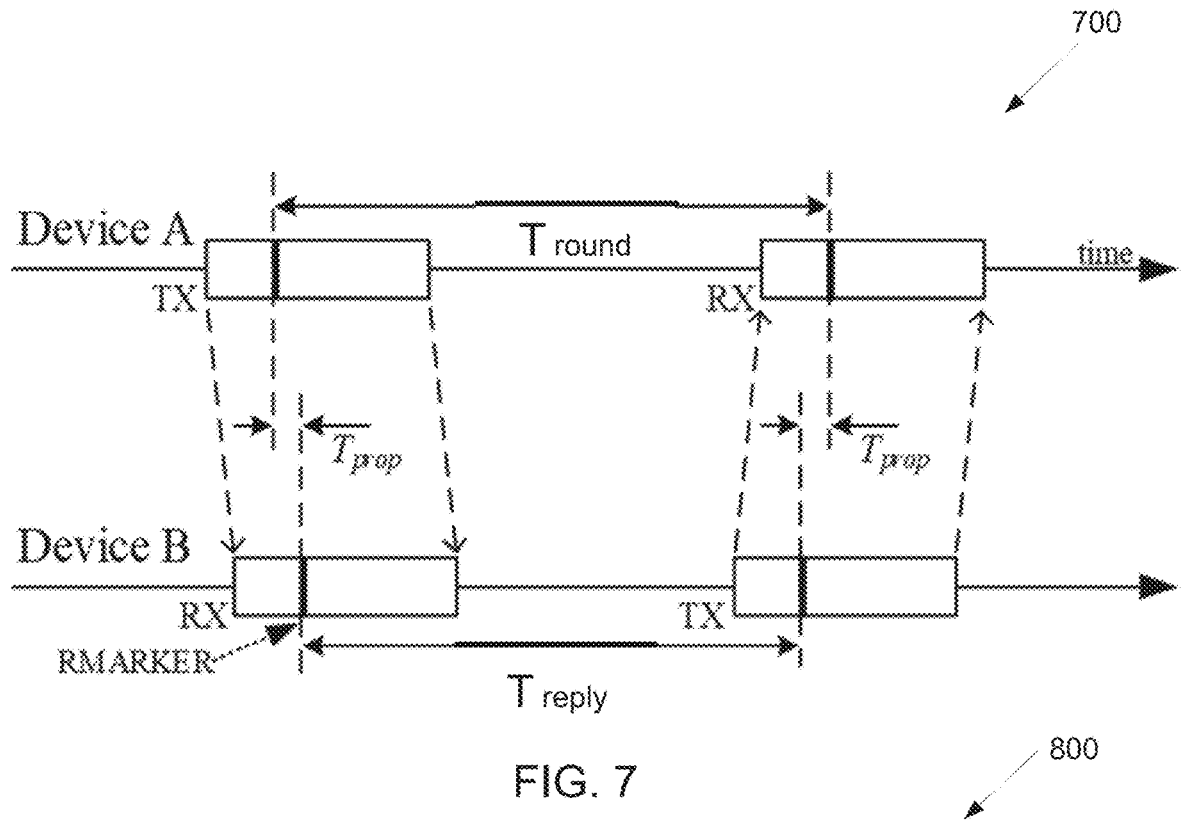
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation. The single-sided two-way ranging 700 may be performed in the electronic device 501 as illustrated in FIG. 5.

SS-TWR involves a simple measurement of the roundtrip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation:

$$\hat{T}_{prop} = \frac{1}{2}(T_{round} - T_{reply}).$$

Figure 8:
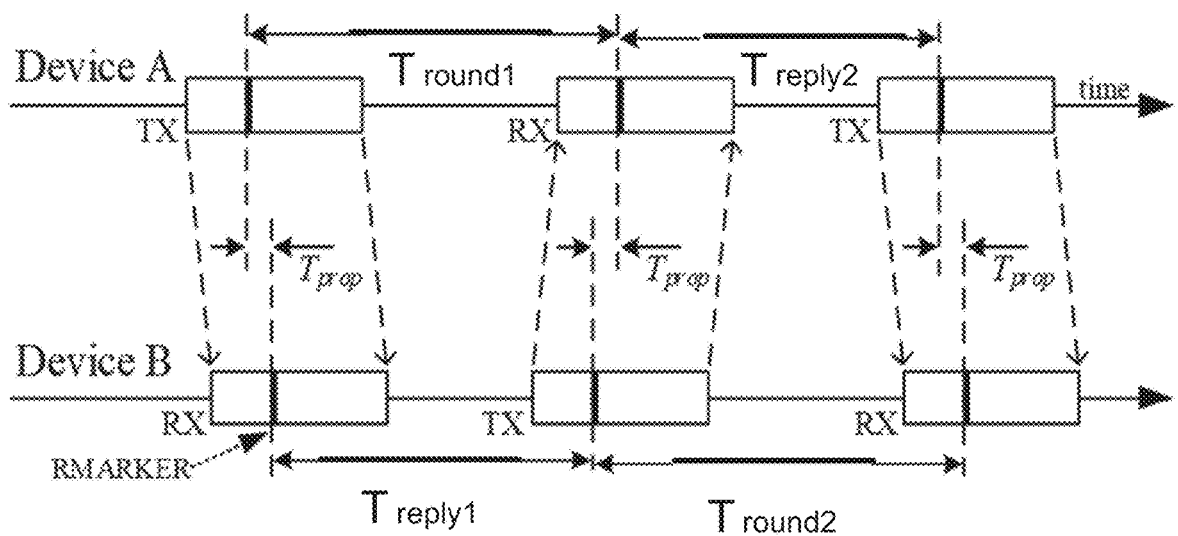
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation. The double-sided two-way ranging with three messages 800 may be performed in the electronic device 501 as illustrated in FIG. 5.

DS-TWR with three messages is illustrated in FIG. 8, which reduces the estimation error induced by clock drift from long response delays. Device A is the initiator to initialize the first roundtrip measurement, while device B as the responder, responses to complete the first roundtrip measurement, and meanwhile initialize the second roundtrip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

Figure 9:
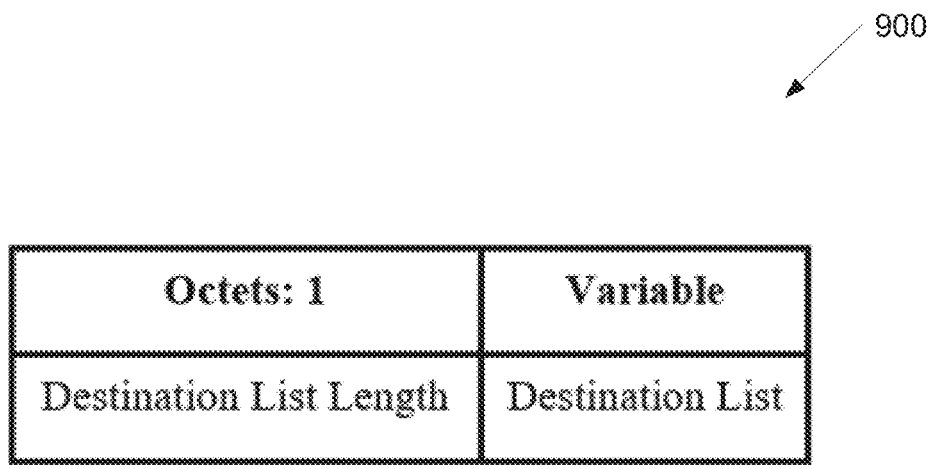
FIG. 9 illustrates an example ranging request reply time IE content field format according to embodiments of the present disclosure.

FIG. 9 illustrates an example ranging request reply time IE content field format 900 according to embodiments of the present disclosure. The embodiment of the ranging request reply time IE content field format 900 illustrated in FIG. 9 is for illustration only. FIG. 9 does not limit the scope of the present disclosure to any particular implementation. As illustrated in FIG. 9, the ranging request reply time IE content field format 900 may be used by the electronic device as illustrated in FIG. 5.

Referring to the payload IEs for ranging control and the transfer of timestamps from the IEEE 802.15.8 document, relevant ranging IEs are introduced here.

The ranging request reply time (RRRT) IE is used as part of a ranging exchange to request a ranging reply time from the remote device participating in the ranging exchange. If RRRT IE is used to request a reply time value of a specific device or multiple devices in multicast/broadcast/many-to-many case, the RRRT IE may include the field for the destination list and the field for the length of destination List as illustrated in FIG. 9. The field of destination list length indicates the number of rows in the destination list, which may be equivalent to the number of devices who need to send the reply time.

Figure 10:
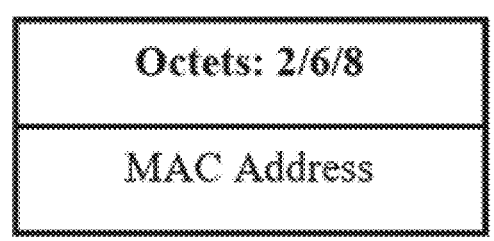
FIG. 10 illustrates an example destination list content field format according to embodiments of the present disclosure.

FIG. 10 illustrates an example destination list content field format 1000 according to embodiments of the present disclosure. The embodiment of the destination list content field format 1000 illustrated in FIG. 10 is for illustration only. FIG. 10 does not limit the scope of the present disclosure to any particular implementation. As illustrated in FIG. 10, the destination list content field format 1000 may be used by the electronic device as illustrated in FIG. 5.

Each row of the destination list includes the field for MAC address of destination device to send the reply time as illustrated in FIG. 10. The MAC address can be a 16-bit short address, 48-bit MAC address, or a 64-bit extended address.

Figure 11:
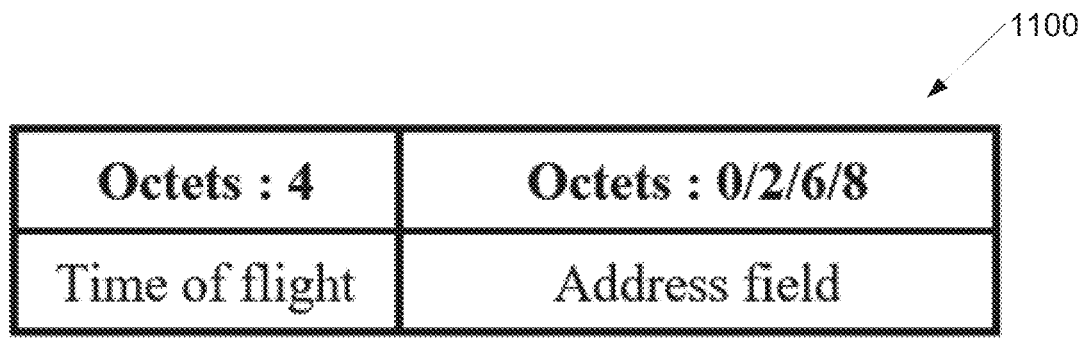
FIG. 11 illustrates an example ranging time-of-flight IE content field format according to embodiments of the present disclosure.

Ranging time-of-flight (RTOF) information element (IE) can be used to communicate the ranging result to the far end if requested. Since multiple ranging results between a device and others can be embedded into one data frame, a MAC address or other short addresses, e.g., a multicast group address can be added to this IE so that the device can extract the ranging result dedicated to it. If a single pair of devices participates in the ranging round, there is no need to use the address field. An example of RTOF IE content field format is shown in FIG. 11. Other examples are not precluded.

FIG. 11 illustrates an example ranging time-of-flight IE content field format 1100 according to embodiments of the present disclosure. The embodiment of the ranging time-of-flight IE content field format 1100 illustrated in FIG. 11 is for illustration only. FIG. 11 does not limit the scope of the present disclosure to any particular implementation. As illustrated in FIG. 11, the ranging time-of-flight IE content field format 1100 may be used by the electronic device as illustrated in FIG. 5.

Figure 12:
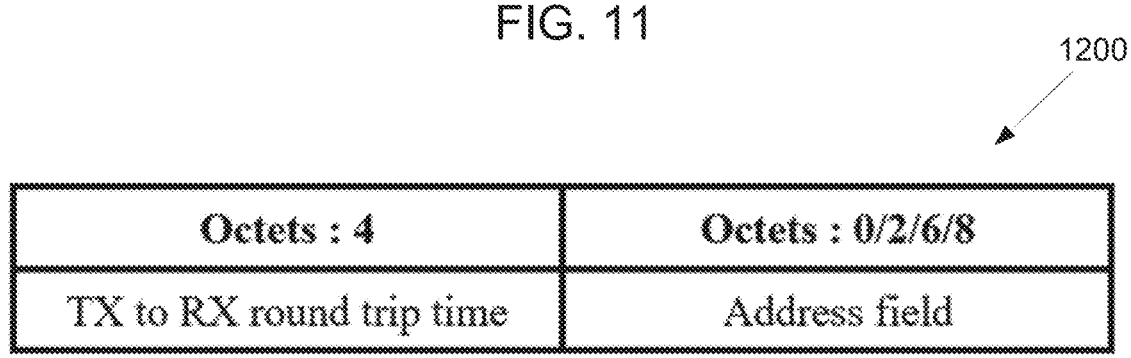
FIG. 12 illustrates an example ranging round trip measurement IE content field format according to embodiments of the present disclosure.

The ranging round trip measurement IE (RRTM IE) content includes the time difference between the transmit time of the ranging frame (RFRAME) initiating a round trip measurement and the receive time of the response RFRAME per source address that completes a round trip. The address field can be a 16-bit short address, a 48-bit MAC address, or a 64-bit extended address. If a single pair of devices participates in the ranging round, there is no need to use the address field. An example RRTM IE content field format is shown in FIG. 12. Other examples are not precluded.

FIG. 12 illustrates an example ranging round trip measurement IE content field format 1200 according to embodiments of the present disclosure. The embodiment of the ranging round trip measurement IE content field format 1200 illustrated in FIG. 12 is for illustration only. FIG. 12 does not limit the scope of the present disclosure to any particular implementation. As illustrated in FIG. 12, the ranging round trip measurement IE content field format 1200 may be used in the electronic device 500 as illustrated in FIG. 5.

Figure 13:
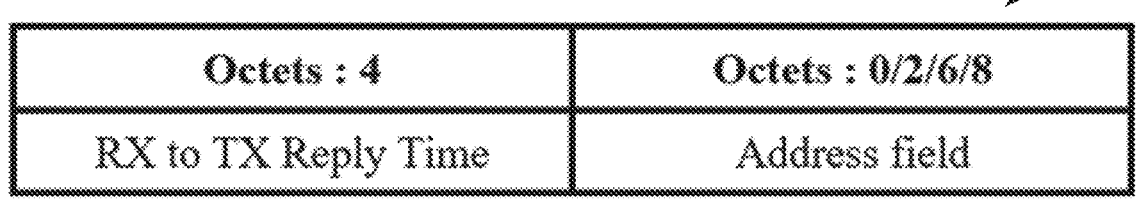
FIG. 13 illustrates an example ranging reply time instantaneous IE content field format according to embodiments of the present disclosure.

The RRTI IE content includes the time difference between the receive time of most recently received RFRAME per source address and the transmit time of the RFRAME containing the IE. The address field can be a 16-bit short address, a 48-bit MAC address, or a 64-bit extended address. If a single pair of devices participates in the ranging round, there is no need to use the address field. An example RRTI IE content field format is shown in FIG. 13. Other examples are not precluded.

FIG. 13 illustrates an example ranging reply time instantaneous IE content field format 1300 according to embodiments of the present disclosure. The embodiment of the ranging reply time instantaneous IE content field format 1300 illustrated in FIG. 13 is for illustration only and may be used in the electronic device as illustrated in FIG. 5. FIG. 13 does not limit the scope of the present disclosure to any particular implementation.

Figure 14:
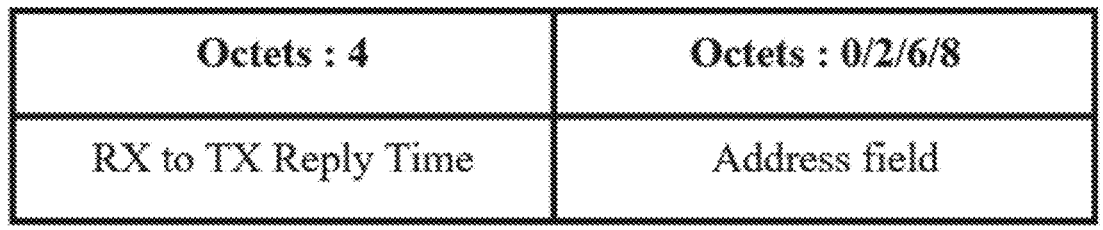
FIG. 14 illustrates an example ranging reply time deferred IE content field format according to embodiments of the present disclosure.

The ranging reply time deferred IE (RRTD IE) content includes the time difference between the receive time of most recently received RFRAME per source address and the transmit time of the responding RFRAME transmitted, sent most recently before the frame containing this IE. The address field can be a 16-bit short address, a 48-bit MAC address, or a 64-bit extended address. If a single pair of devices participates in the ranging round, there is no need to use the address field. An example RRTD IE content field format is shown in FIG. 14. Other examples are not precluded.

FIG. 14 illustrates an example ranging reply time deferred IE content field format 1400 according to embodiments of the present disclosure. The embodiment of the ranging reply time deferred IE content field format 1400 illustrated in FIG. 14 is for illustration only and may be used in the electronic device as illustrated in FIG. 5. FIG. 14 does not limit the scope of the present disclosure to any particular implementation.

The ranging angle-of-arrival (AoA) deferred (RAD) IE content includes the AoA estimation at the device receiving request of AoA. The RAD IE is employed as part of two-way ranging exchanges and used in the case where the device cannot determine the AoA until after the reply has been sent, and in this case the RAD IE carries the AoA in a subsequent frame. When the RAD IE is used in multicast/broadcast frame (e.g., multicast/broadcast/many-to-many ranging), the RAD IE content can include a MAC address or a device ID of source who requests the AoA estimation. The address field can be a 16-bit short address, a 48-bit MAC address, or a 64-bit extended address. Otherwise, the RAD IE has a zero-length content field. The content field of the RAD IE can be formatted as shown in FIG. 15.

Figure 15:
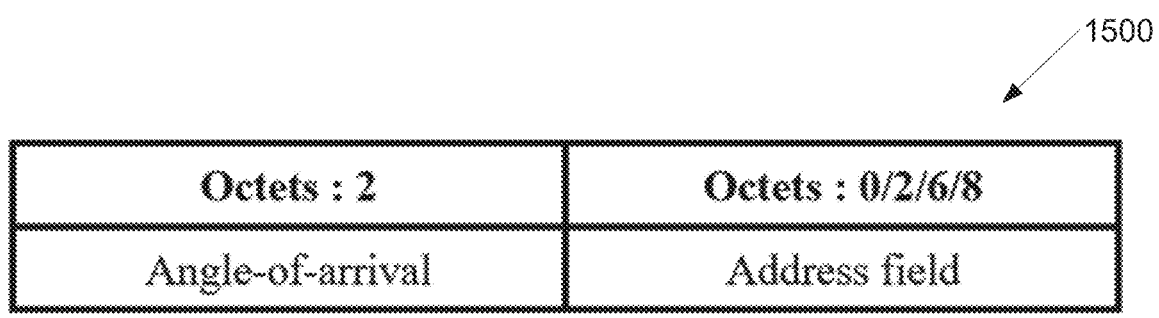
FIG. 15 illustrates an example ranging angle-of-arrival deferred IE content field format according to embodiments of the present disclosure.

FIG. 15 illustrates an example ranging angle-of-arrival deferred IE content field format 1500 according to embodiments of the present disclosure. The embodiment of the ranging angle-of-arrival deferred IE content field format 1500 illustrated in FIG. 15 is for illustration only and may be used in the electronic device as illustrated in FIG. 5. FIG. 15 does not limit the scope of the present disclosure to any particular implementation.

Figure 16:
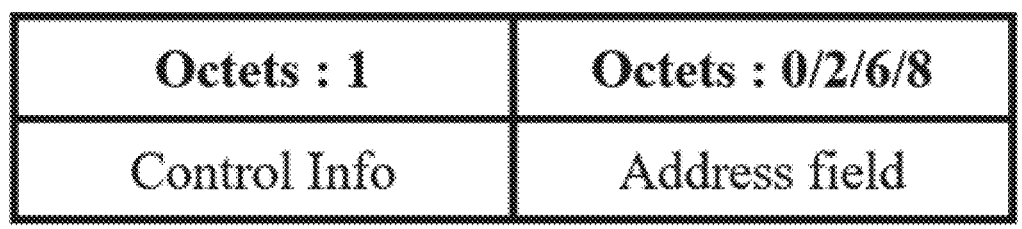
FIG. 16 illustrates an example ranging control single-sided TWR IE content field format according to embodiments of the present disclosure.

The ranging report control single-sided TWR (RRCST) IE is used to control SS-TWR message exchange. An example RCST IE content field format is shown in FIG. 16 and TABLE 1. Other examples are not precluded.

FIG. 16 illustrates an example ranging control single-sided TWR IE content field format 1600 according to embodiments of the present disclosure. The embodiment of the ranging control single-sided TWR IE content field format 1600 illustrated in FIG. 16 is for illustration only and may be used in the electronic device as illustrated in FIG. 5. FIG. 16 does not limit the scope of the present disclosure to any particular implementation.

TABLE 1

Values of the control info field in the ranging report control single-sided TWR IE

| Control Info value | Meaning |
| --- | --- |
| 0 | This frame indicates that the responding end does not require TX-to-RX round-trip time and ranging result |
| 1 | This frame indicates that the responding end requires TX-to-RX round-trip time at the end of exchange |
| 2 | This frame indicates that the responding end requires ranging result at the end of exchange |

Figure 17:
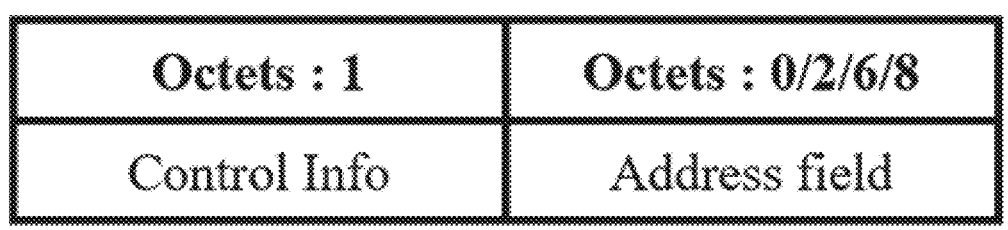
FIG. 17 illustrates an example ranging control double-sided TWR IE content field format according to embodiments of the present disclosure.

The ranging report control double-sided TWR (RRCDT) IE is used to control DS-TWR message exchange. An example RCDT IE content field format is shown in FIG. 17 and TABLE 2. Other examples are not precluded.

FIG. 17 illustrates an example ranging control double-sided TWR IE content field format 1700 according to embodiments of the present disclosure. The embodiment of the ranging control double-sided TWR IE content field format 1700 illustrated in FIG. 17 is for illustration only and may be used in the electronic device as illustrated in FIG. 5. FIG. 17 does not limit the scope of the present disclosure to any particular implementation.

TABLE 2

Values of the Control Info field in the Ranging Report Control Double-sided TWR IE

| Control Info value | Meaning |
| --- | --- |
| 0 | This frame is initiating DS-TWR and indicates that the initiating end does not require $1^{st}$ reply time, $2^{nd}$ TX-to-RX round-trip time or the ranging result |
| 1 | This frame is initiating DS-TWR and indicates that initiating end requires $1^{st}$ reply time and $2^{nd}$ TX-to-RX round-trip time at the end of exchange |
| 2 | This frame is initiating DS-TWR and indicates that initiating end requires ranging result at the end of exchange |
| 3 | This frame is continuing the DS-TWR, forming the request for the $2^{nd}$ TX-to-RX round-trip measurement |

Figure 18:
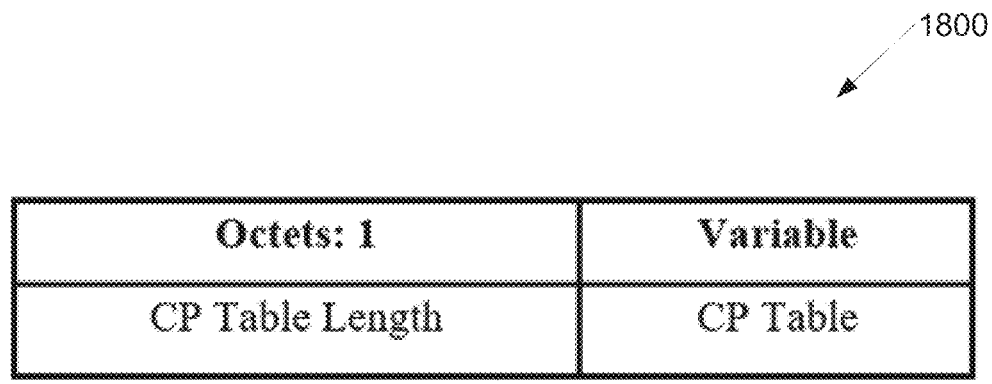
FIG. 18 illustrates an example content fields of contention period (CP) IE according to embodiments of the present disclosure.
Figure 19:
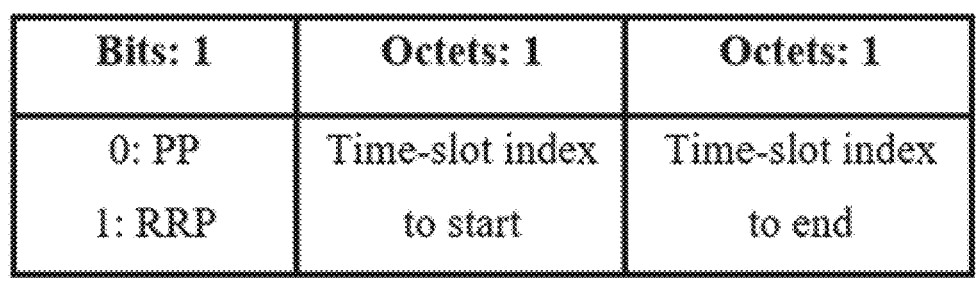
FIG. 19 illustrates an example row of CP table according to embodiments of the present disclosure.

The contention period (CP) IE is used to define separate contention periods in a ranging round, where each contention period is either a PP or an RRP. FIG. 18 and FIG. 19 exhibit one example of the IE content fields to fulfill the functionality of defining different contention periods; other examples are not precluded.

FIG. 18 illustrates an example content fields of contention period (CP) IE 1800 according to embodiments of the present disclosure. The embodiment of the content fields of contention period (CP) IE 1800 illustrated in FIG. 18 is for illustration only and may be used in the electronic device as illustrated in FIG. 5. FIG. 18 does not limit the scope of the present disclosure to any particular implementation.

FIG. 19 illustrates an example row of CP table 1900 according to embodiments of the present disclosure. The embodiment of the row of CP table 1900 illustrated in FIG. 19 is for illustration only and may be used in the electronic device as illustrated in FIG. 5. FIG. 19 does not limit the scope of the present disclosure to any particular implementation.

Each row of contention period (CP) table represent a contention-based PP/RRP, and the assigned time slots between the start index and the end index. The CP table Length indicates the number of rows in the CP table, which is equivalent to number of contention periods in a round.

Figure 20:
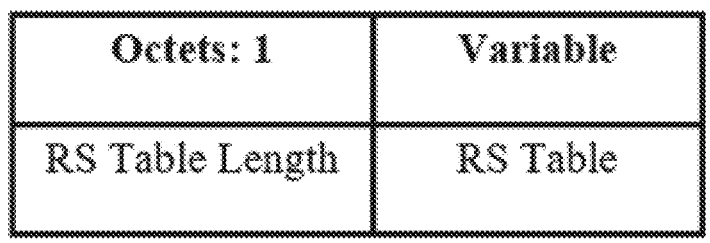
FIG. 20 illustrates an example content fields of ranging scheduling (RS) IE according to embodiments of the present disclosure.

FIG. 20 illustrates an example content fields of ranging scheduling (RS) IE 2000 according to embodiments of the present disclosure. The embodiment of the content fields of ranging scheduling (RS) IE 2000 illustrated in FIG. 20 is for illustration only and may be used in the electronic device as illustrated in FIG. 5. FIG. 20 does not limit the scope of the present disclosure to any particular implementation.

Figure 21:
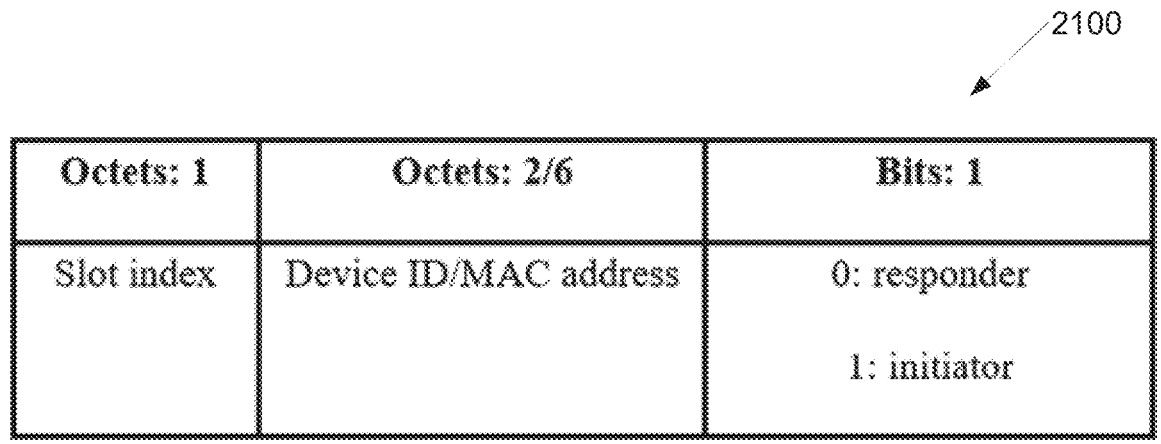
FIG. 21 illustrates an example row of RS table according to embodiments of the present disclosure.

FIG. 21 illustrates an example row of RS table 2100 according to embodiments of the present disclosure. The embodiment of the row of RS table 2100 illustrated in FIG. 21 is for illustration only and may be used in the electronic device as illustrated in FIG. 5. FIG. 21 does not limit the scope of the present disclosure to any particular implementation.

For the scheduling-based ranging, the ranging scheduling (RS) IE can be used to convey the resource assignment. FIG. 20 and FIG. 21 illustrate an example of the content fields of the RS IE; other examples to fulfill the same functionality are not precluded.

The RS IE contains an RS table, where each row consists of a time slot index, the address of device assigned to this slot, and the flag to indicate the role of the assigned device. The field of RS table Length indicate the number of rows in the RS table, which is equivalent to the number of available time slots/resource elements in a ranging round. After successfully exchange this IE in the UWB network, controller and controlees know their respective roles, and scheduling assignment in this ranging round. Then, devices can behave accordingly once the ranging round starts.

Figure 22:
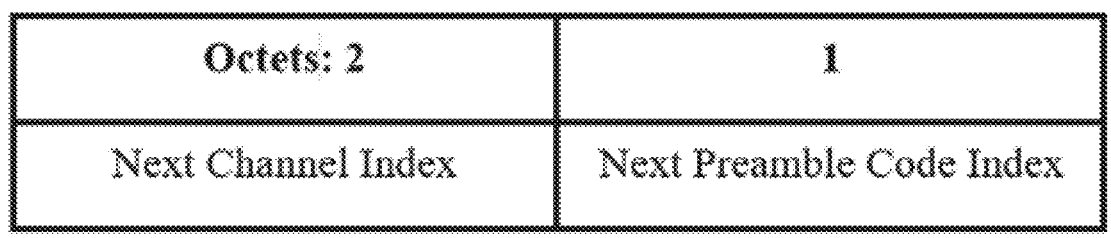
FIG. 22 illustrates an example ranging next channel and preamble IE content field format according to embodiments of the present disclosure.

FIG. 22 illustrates an example ranging next channel and preamble IE content field format 2200 according to embodiments of the present disclosure. The embodiment of the ranging next channel and preamble IE content field format 2200 illustrated in FIG. 22 is for illustration only and may be used in the electronic device as illustrated in FIG. 5. FIG. 22 does not limit the scope of the present disclosure to any particular implementation.

The ranging next channel and preamble (RNCP) IE is used to specify the channel index and preamble code index of next ranging block. The ranging next channel and preamble IE content field may be formatted as illustrated in FIG. 22.

Figure 23:
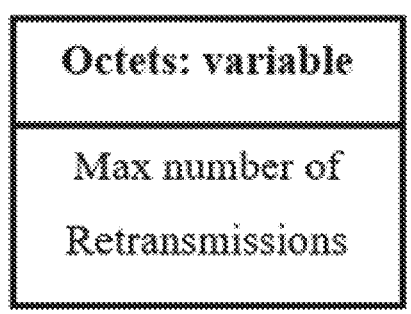
FIG. 23 illustrates an example ranging max retransmission IE content field format according to embodiments of the present disclosure.

FIG. 23 illustrates an example ranging max retransmission IE content field format 2300 according to embodiments of the present disclosure. The embodiment of the ranging max retransmission IE content field format 2300 illustrated in FIG. 23 is for illustration only and may be used in the electronic device as illustrated in FIG. 5. FIG. 23 does not limit the scope of the present disclosure to any particular implementation.

The ranging max retransmission (RMR) IE is to specify the maximum number of retries for initiators/responders to contend in multiple contention-based ranging rounds. An example of IE content fields is illustrated in FIG. 23; other examples are not precluded.

Figure 24:
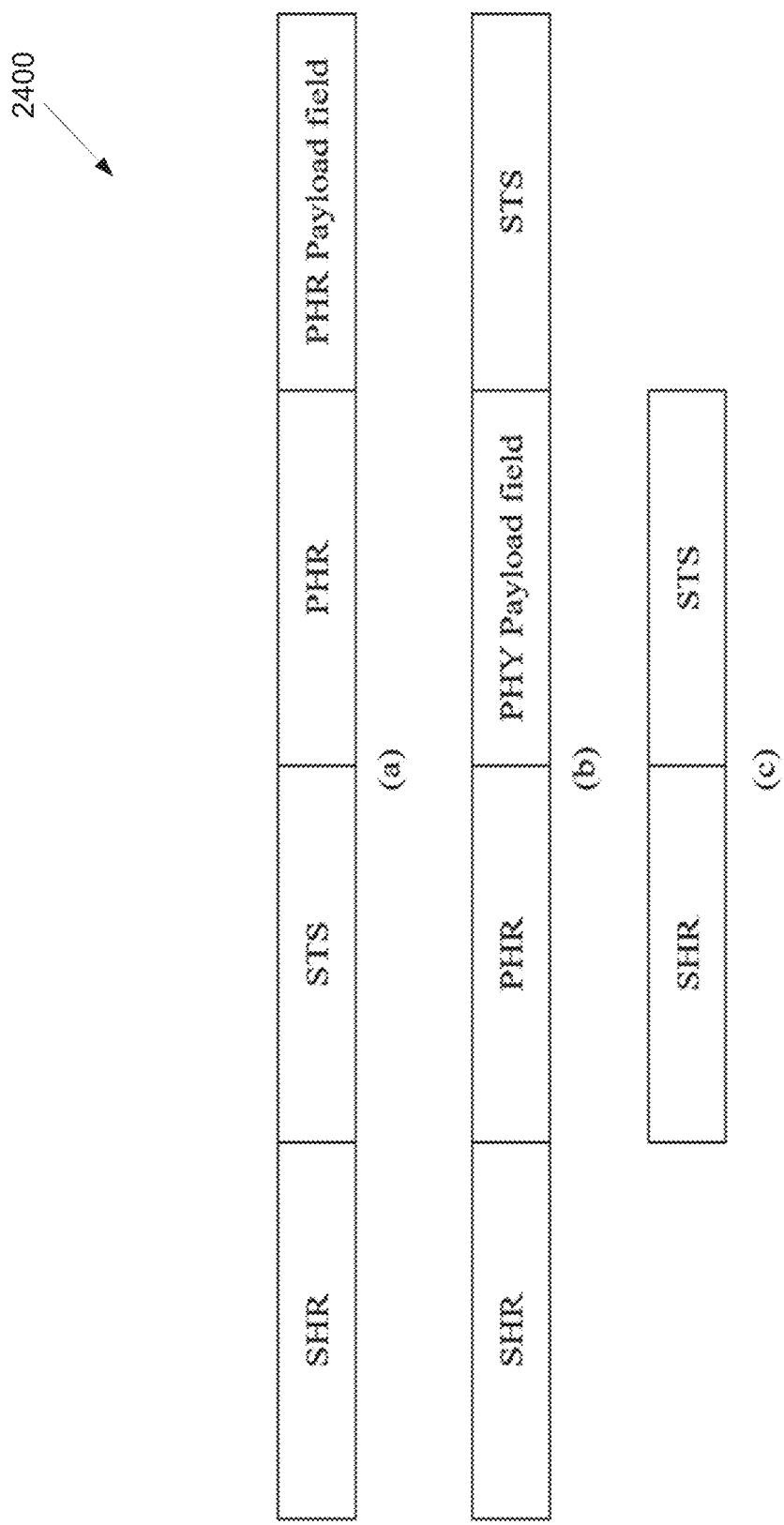
FIG. 24 illustrates an example three secure ranging PPDU formats according to embodiments of the present disclosure.

FIG. 24 illustrates an example three secure ranging PPDU formats 2400 according to embodiments of the present disclosure. The embodiment of the three secure ranging PPDU formats 2400 illustrated in FIG. 24 is for illustration only and may be used in the electronic device as illustrated in FIG. 5. FIG. 24 does not limit the scope of the present disclosure to any particular implementation.

In the development of IEEE 802.15.4z, the main enhancement for secure ranging is the inclusion a scrambled timestamp sequence (STS) in the basic PHY protocol data unit (PPDU) format. Since the unique STS of a device is known by one or more far ends in a trusted group, the secure ranging can be performed within the trusted group, and the chance of being attacked is significantly reduced. In this disclosure, we build the framework upon the fact that STSs of devices have been exchanged successfully, which can be done via, e.g., a higher layer control or out-of-band management. How to initialize/update STS and exchange it between devices is out of the scope of this disclosure.

Three secure ranging PPDU formats may be supported, the difference between the formats being the location of the STS and existence of a PHR and PHY payload field as FIG. 16. Abbreviations in FIG. 24 represent the following definitions, respectively: synchronization header (SHR); scrambled timestamp sequence (STS); and PHY header (PHY).

The locations of STS are different in FIG. 24. For the format of FIG. 24 (e.g., (c) in FIG. 24), there is no PHY header or data field (NHD). We can call the ranging based on PPDU format of FIGURE (e.g., (c) in FIG. 24) as NHD secure ranging. Other conventions which fulfill similar concepts are not precluded in this disclosure.

Figure 25:
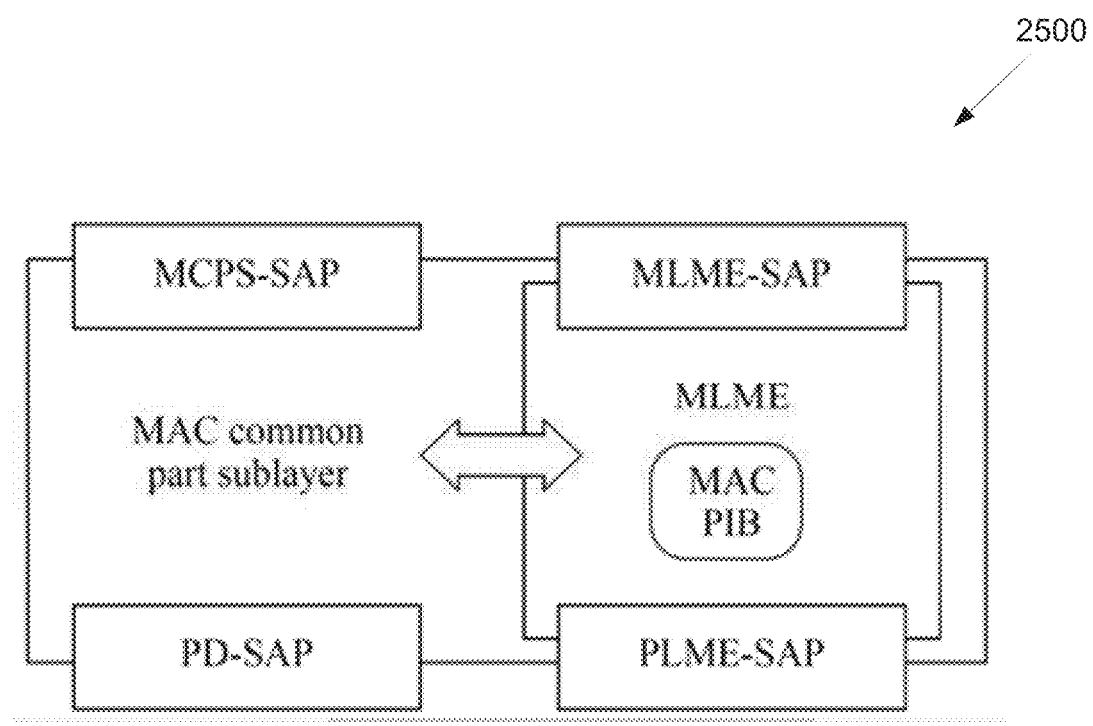
FIG. 25 illustrates an example MAC sublayer reference model according to embodiments of the present disclosure.

FIG. 25 illustrates an example MAC sublayer reference model 2500 according to embodiments of the present disclosure. The embodiment of the MAC sublayer reference model 2500 illustrated in FIG. 25 is for illustration only and may be used in the electronic device as illustrated in FIG. 5. FIG. 25 does not limit the scope of the present disclosure to any particular implementation.

According to IEEE standard specification, the MAC sublayer provides an interface between the next higher layer and the PHY. The MAC sublayer conceptually includes a management entity called the MLME. This entity provides the service interfaces through which layer management may be invoked. The MLME is also responsible for maintaining a database of managed objects pertaining to the MAC sublayer. This database is referred to as the MAC sublayer PIB. FIG. 25 depicts the components and interfaces of the MAC sublayer.

In the present disclosure, an UWB network is considered with ranging requests between a group of devices and another group of devices. As FIG. 6 exhibits, one or more devices of group-1 has the ranging request to one or more devices of group-2 or vice versa.

By utilizing the broadcast characteristics of wireless channel, optimized schemes with reduced number of transmissions can be realized for use cases where there are one or more initiators and one or more responders. To accommodate the secure ranging and optimized transmission scheme, this disclosure modifies primitives of MAC service and define new PIB attributes in IEEE standard specification for the development of IEEE 802.15.4z.

Figure 26:
FIG. 26 illustrates an example time structure of ranging round according to embodiments of the present disclosure.

FIG. 26 illustrates an example time structure of ranging round 2600 according to embodiments of the present disclosure. The embodiment of the time structure of ranging round 2600 illustrated in FIG. 26 is for illustration only and may be used by the electronic device as illustrated in FIG. 5. FIG. 26 does not limit the scope of the present disclosure to any particular implementation.

A ranging configuration incorporates the control information of a ranging round, which consists of multiple time slots as illustrated in FIG. 26. Time slot is the basic time unit to fulfill a message exchange. Other conventions to fulfill the same functionalities as ranging round and time slot are not precluded in this disclosure. Depending on the device capabilities, slot duration and number of time slots in a ranging round can be adjusted in the ranging configuration, or the slot duration and number of time slots are fixed to a default setting. One or multiple pairs of devices can participate in a ranging round to fulfill the ranging requests.

Figure 27:
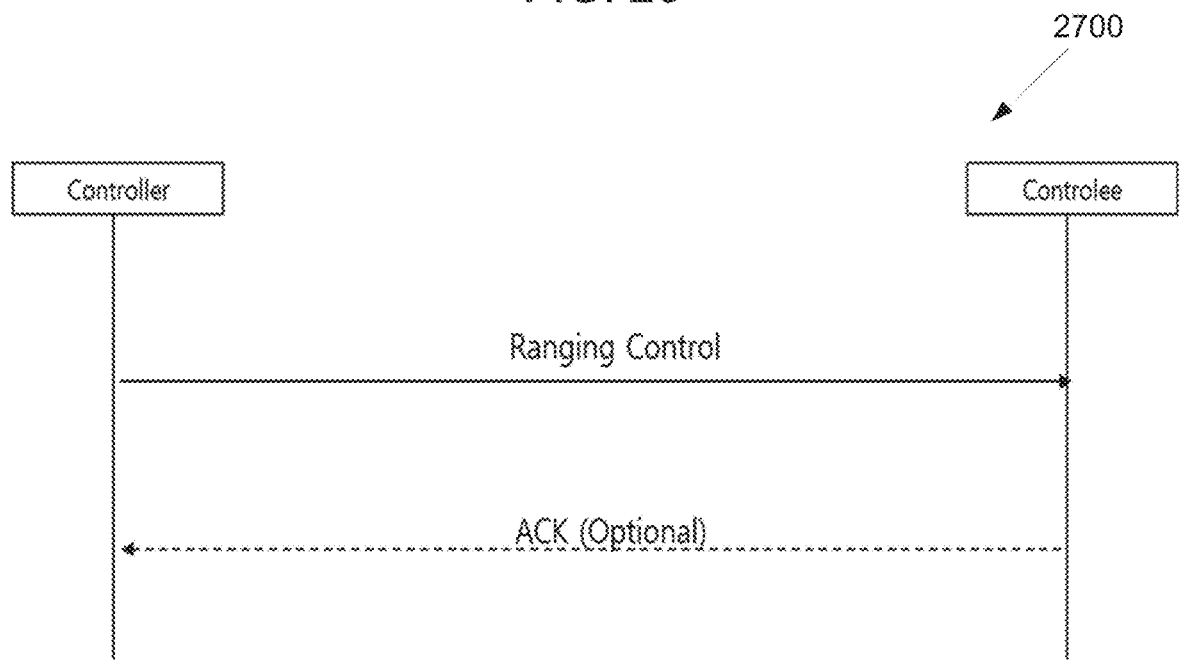
FIG. 27 illustrates another example ranging device nomenclatures: controller and controlee according to embodiments of the present disclosure.

FIG. 27 illustrates an example ranging device nomenclatures 2700 (a controller and a controlee) according to embodiments of the present disclosure. The embodiment of the ranging device nomenclatures 2700 illustrated in FIG. 27 is for illustration only. FIG. 27 does not limit the scope of the present disclosure to any particular implementation. As illustrated in FIG. 27, the controller and the controlee may be the electronic device 501 as illustrated in FIG. 5. In one embodiment, the controller and the controlee as illustrated in FIG. 27 may be one of nodes in the group 1 and/or group 2 as illustrated in FIG. 6.

The setting of a ranging configuration determined by the next higher layer can be sent to one or more ranging controlees from a ranging controller (lead device) as illustrated in FIG. 27. With different network formations, the ranging configuration can be conveyed via a dedicated data frame sent to one or more devices, or it can be embedded into a sync frame broadcast to devices in the network. Meanwhile, the present disclosure does not preclude other methods to exchange the ranging configuration information, e.g., via the higher layer or our-of-band management.

Figure 28:
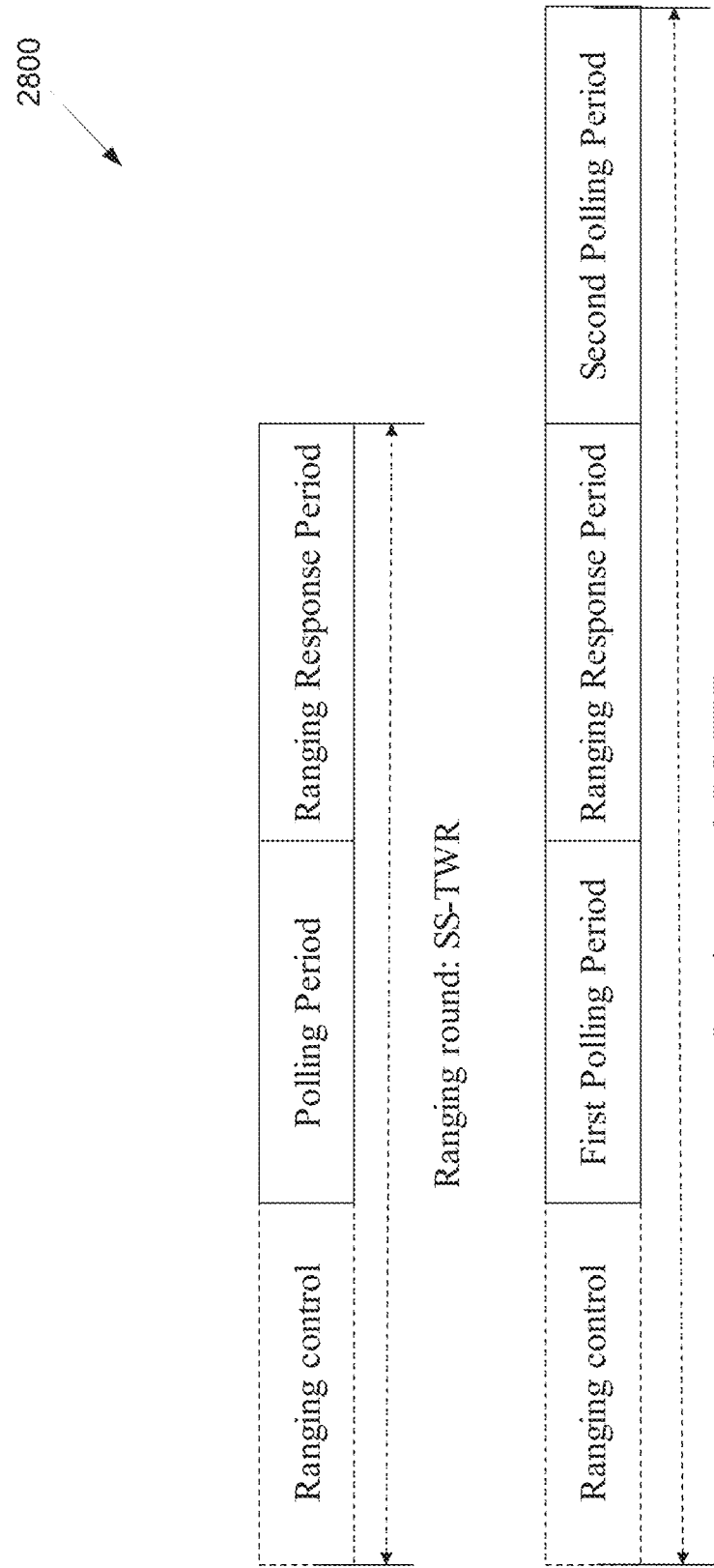
FIG. 28 illustrates an example ranging round structure according to embodiments of the present disclosure.

FIG. 28 illustrates an example ranging round structure 2800 according to embodiments of the present disclosure. The embodiment of the ranging round structure 2800 illustrated in FIG. 28 is for illustration only and may be used by the electronic device as illustrated in FIG. 5. FIG. 28 does not limit the scope of the present disclosure to any particular implementation.

Ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s). FIG. 28 respectively illustrates two examples for the SS-TWR and DS-TWR with three message exchanges, other examples are not precluded. A ranging round can start with a ranging control period to exchange the ranging configuration over the UWB MAC. However, a ranging round can also start with a polling period if the ranging configuration is exchanged at the higher layer.

For the SS-TWR, one ranging round contains a PP and an RRP. For the DS-TWR with three messages, one ranging round contains a first PP, an RRP, and a second PP. Each period includes one or more time slots, where transmissions from initiator(s)/responder(s) can be scheduled as determined by the next higher layer or they can contend time slots in the corresponding periods, respectively.

Figures 29, 30:
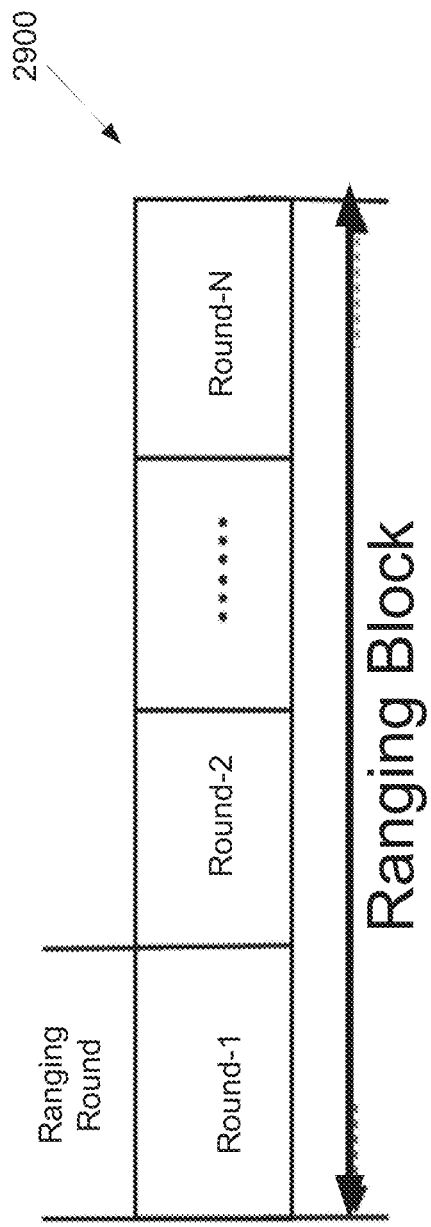
FIG. 29 illustrates an example ranging block structure according to embodiments of the present disclosure.
FIG. 30 illustrates an example ARC IE content field format according to embodiments of the present disclosure.

FIG. 29 illustrates an example ranging block structure 2900 according to embodiments of the present disclosure. The embodiment of the ranging block structure 2900 illustrated in FIG. 29 is for illustration only and may be used by the electronic device as illustrated in FIG. 5. FIG. 29 does not limit the scope of the present disclosure to any particular implementation.

Ranging block refers to a virtual frame for ranging which consists of multiple ranging rounds as FIG. 29 exhibits. UWB MAC can be operated on a block-based structure, where the block length, and the number of ranging rounds in a block can be configurable. In a ranging block, one or more ranging rounds can be active.

FIG. 30 illustrates an example ARC IE content field format 3000 according to embodiments of the present disclosure. The embodiment of the ARC IE content field format 3000 illustrated in FIG. 30 is for illustration only and may be used in the electronic device as illustrated in FIG. 5. FIG. 30 does not limit the scope of the present disclosure to any particular implementation.

The advanced ranging control IE (ARC IE) is used by a controller to send the ranging configuration information to a controlee (in a unicast frame) or multiple controlees (in a broadcast frame). The content field of the ARC IE is formatted as shown in FIG. 30. The detailed definitions of fields can be referred to IEEE 802.15.4z.

Figure 31:
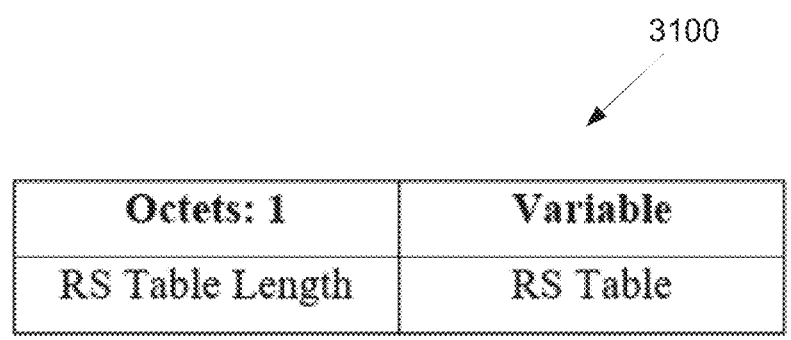
FIG. 31 illustrates an example RS IE content field format according to embodiments of the present disclosure.

FIG. 31 illustrates an example RS IE content field format 3100 according to embodiments of the present disclosure. The embodiment of the RS IE content field format 3100 illustrated in FIG. 31 is for illustration only and may be used in the electronic device as illustrated in FIG. 5. FIG. 31 does not limit the scope of the present disclosure to any particular implementation.

Figure 32:
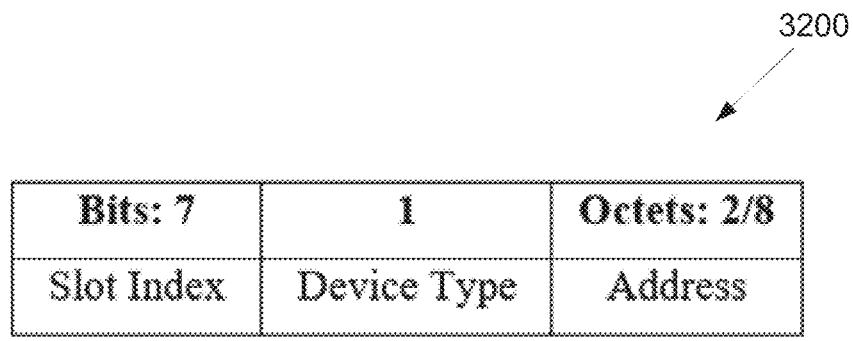
FIG. 32 illustrates an example RS Table element format according to embodiments of the present disclosure.

FIG. 32 illustrates an example RS Table element format 3200 according to embodiments of the present disclosure. The embodiment of the RS Table element format 3200 illustrated in FIG. 32 is for illustration only and may be used in the electronic device as illustrated in FIG. 5. FIG. 32 does not limit the scope of the present disclosure to any particular implementation.

The ranging scheduling IE (RS IE) is used in scheduled-based ranging to specify the list of devices selected to participate in a ranging round and convey the slot resource assignment for each device. This applies when the multi-node mode field of ARC IE indicated many-to-many or one-to-many without contention. The content field of the RS IE may be formatted as shown in FIG. 31 and FIG. 32.

In one embodiment, the present disclosure provides new primitives and modifies existing ones supported by the MCPS-SAP, which are necessary to accommodate the above normal/secure ranging configuration for the development of IEEE 802.15.4z. Similar conventions to respectively fulfill the same functions can also be used, which are not restricted by this disclosure.

According to IEEE standard specification, the MCPS-DATA.request primitive requests the transfer of data to another device. The present disclosure modifies the description of the parameter Ranging, and introduces two parameters, i.e., RequestRrtiTx and TxTime, which are also used in IEEE standard specification. The semantics of this primitive are as follows:

```
MCPS-DATA.request    (
                     Ranging,
                     RequestRrtiTx,
                     TxTime,
                     Other parameters in the IEEE standard
                     specification,
                     )
```

The modified primitive parameters are defined in TABLE 3A.

TABLE 3A

MCPS-DATA.request parameters (Modified)

| Name | Type | Valid range | Description |
|---|---|---|---|
| Ranging | Enumeration | NON_RANGING, ALL_RANGING_NORMAL, ALL_RANGING_SECURE, PHY_HEADER_ONLY, PHY_STS_ONLY | A value of NON_RANGING indicates that ranging is not to be used. A value of ALL_RANGING_NORMAL indicates that ranging operations using both the ranging bit in the PHR and the counter operation are enabled. A value of ALL_RANGING_SECURE indicates that ranging operations using both the ranging bit in the STS and the counter operation are enabled. A value of PHY_HEADER_ONLY indicates that only the ranging bit in the PHR may be used. A value of PHY_STS_ONLY indicates that only the ranging bit in the STS may be used. A value of NON_RANGING is PHYs that do not support ranging. |
| RequestRrtiTx | Boolean | TRUE, FALSE | This parameter is present only when primitive parameter Ranging is used with a value ALL_RANGING_NORMAL or ALL_RANGING_Secure. This parameter requests that the ranging device inserts an RRTI IE in the sent Data frame. If the MCPS-DATA.request is early enough the Data frame may be sent at the configured macUWBRngRrtiTime, otherwise may be sent as soon as possible thereafter. |
| TxTime | 24-bit integer | 0 to $2^{24} - 1$ | For the UWB PHY this parameter specifies the transmit time for the frame. If scheduled transmission is used, this time may be the start of the scheduled time slot, otherwise it may be with respect to the start of the contention period. |

With the modified range of the parameter Ranging in the TABLE 3, the higher layer is able to invoke the specified ranging type at the UWB MAC, e.g., secure or normal ranging.

When the secure or normal ranging is enabled, the higher layer can use the primitive parameter RequestRrtiTx to request the insertion of the replied time in the sent data frame. In TABLE 3, macUWBRngRrtiTime sets the desired RX-to-TX response time. Other already existing primitive parameters in IEEE 802.15.4 are maintained the same, which are not precluded by the present disclosure.

A single RFRAME can be broadcast to multiple ranging devices, while destinations of inserted ranging IEs can be distinguished by respective address fields, e.g., in FIG. 12 and FIG. 13. For example, in multicast ranging between one ranging initiator and multiple ranging responders, the initiator can embed RRTI IEs in the second poll message to responders as FIG. 8.

Figure 33:
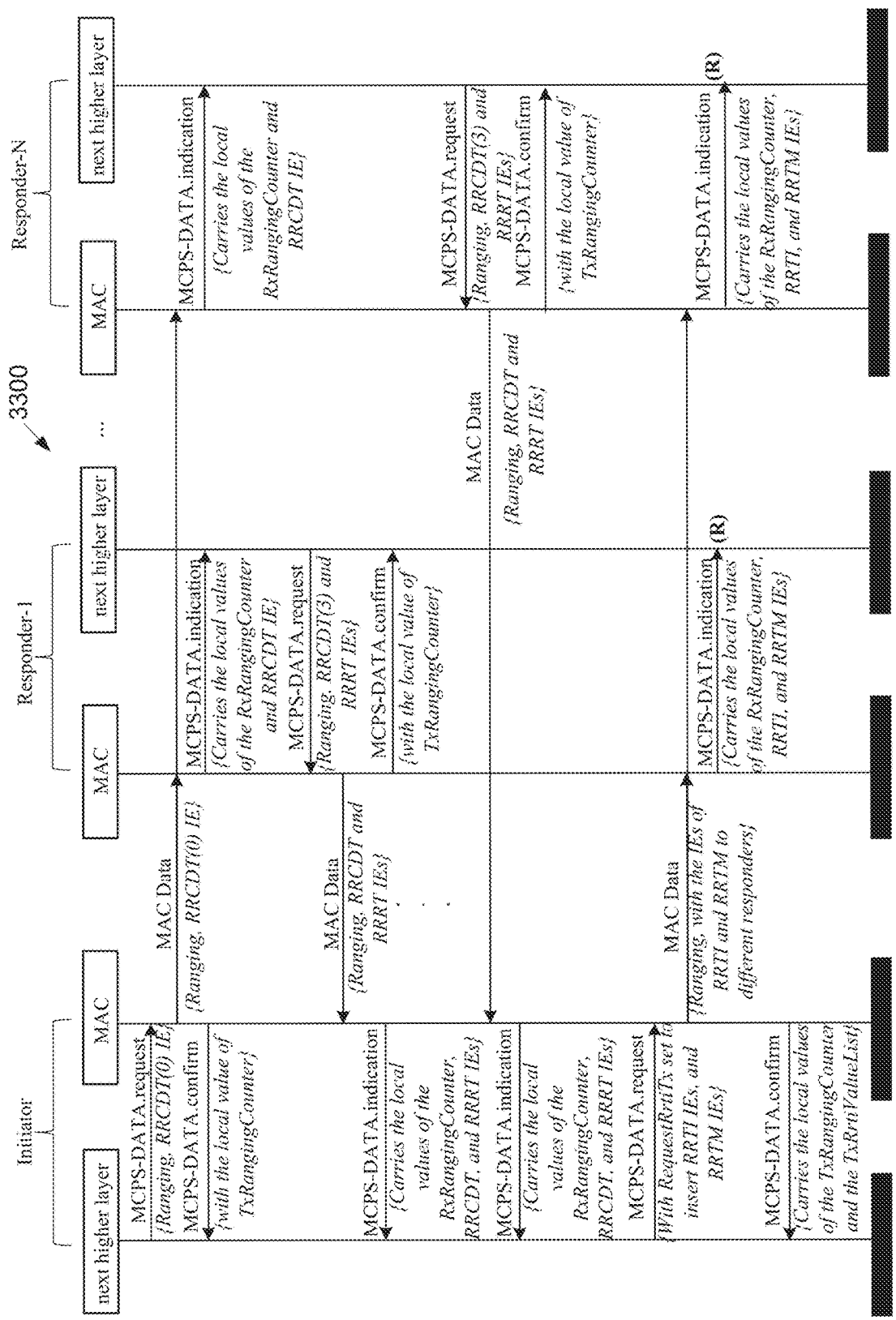
FIG. 33 illustrates an example message sequence chart of multicast DS-TWR where MAC layer is capable of storing timestamps of received RFRAMEs and corresponding source addresses according to embodiments of the present disclosure.

FIG. 33 illustrates an example message sequence chart 3300 of multicast DS-TWR where a MAC layer is capable of storing timestamps of received RFRAMEs and corresponding source addresses according to embodiments of the present disclosure. The embodiment of the message sequence chart 3300 illustrated in FIG. 33 is for illustration only. FIG. 33 does not limit the scope of the present disclosure to any particular implementation.

As illustrated in FIG. 33, the initiator, the responder-1, and responder-N may perform a function or functions of 111-116 and/or 101-103 as illustrated in FIG. 1. The initiator, the responder-1, and responder-N may be one of nodes in a group 1 and/or group 2 as illustrated in FIG. 6. The initiator, the responder-1, and responder-N may be the electronic device 501 as illustrated in FIG. 5.

After collecting RFRAMEs with RRRT IEs from different far ends, if a MAC layer of a ranging device is capable of storing received timestamp and source identity/address of each RFRAME, a next higher layer of the ranging device can request a MAC layer to insert RRTI IEs in the next RFRAME by setting RequestRrtiTx to be TRUE. An example of message sequence chart for a ranging round can be found in FIG. 33.

Figure 34:
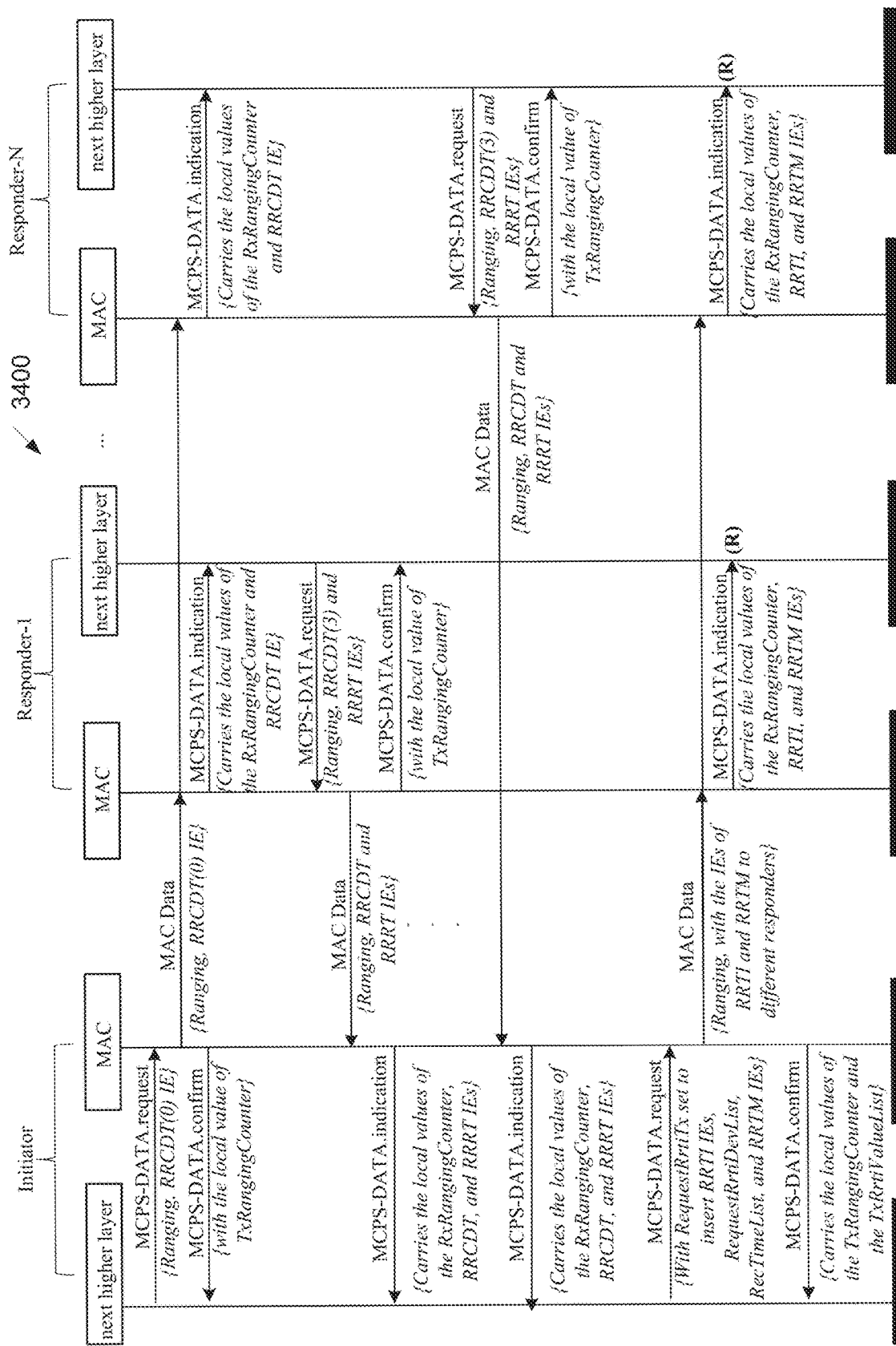
FIG. 34 illustrates an example message sequence chart of multicast DS-TWR where MAC layer cannot store timestamps of received RFRAMEs and corresponding source addresses according to embodiments of the present disclosure.

FIG. 34 illustrates an example message sequence chart 3400 of multicast DS-TWR where a MAC layer cannot store timestamps of received RFRAMEs and corresponding source addresses according to embodiments of the present disclosure. The embodiment of the message sequence chart 3400 illustrated in FIG. 34 is for illustration only. FIG. 34 does not limit the scope of the present disclosure to any particular implementation.

As illustrated in FIG. 34, the initiator, the responder-1, and responder-N may perform a function or functions of 111-116 and/or 101-103 as illustrated in FIG. 1. The initiator, the responder-1, and responder-N may be one of nodes in a group 1 and/or group 2 as illustrated in FIG. 6. The initiator, the responder-1, and responder-N may be the electronic device 501 as illustrated in FIG. 5.

Depending on specific implementations, without additional memory to store timestamps and corresponding source addresses, a MAC layer can convey the information to next higher layer. For this situation, additional parameters need to be introduced in the primitive of MCPS-Data.request to control a MAC layer inserting RRTI IEs, which can be defined as TABLE 4; other terms to fulfill similar functionalities are not precluded by this disclosure. An example of message sequence chart for a ranging round where a MAC layer is not capable of storing timestamps and source addresses is illustrated in FIG. 34.

TABLE 4

Additional MCPS-DATA.request parameters

| Name | Type | Valid range | Description |
|---|---|---|---|
| RequestRrtiDevList | List of addresses | 2-byte short address, 6-byte MAC address, or 8-byte extended address | This parameter is present only when phyModeSelection is UWB. List of ranging device address to which the RFRAME embedded with RRTI IEs is transferred. This parameter may be used when RequestRrtiTx is TRUE, and RRTI IEs need to be sent to multiple ranging devices. |
| RecTimeList | List of 32-bit timestamps | 0 to $2^{32} - 1$ | This parameter is present only when phyModeSelection is UWB, and RequestRrtiDevList is valid. The parameter lists timestamps of last received RFRAME from ranging devices listed in RequestRrtiDevList |

With the inclusion of parameters in TABLE 4, the semantics of data request primitive becomes:

MCPS-DATA.request (
    Ranging,
    RequestRrtiTx,
    RequestRrtiDevList,
    RecTimeList,
    TxTime,
    Other parameters in IEEE standard specification,
)

The parameters in TABLE 4 can also be combined into a single one, namely RrtiNodeList, which contains lists of RequestRrtiDevList and RecTimeList.

In the development of IEEE 802.15.4z, to enable the usage of STS may be controlled by other next higher layer primitives. The Ranging parameter in the TABLE 3A can be redefined in the following way in TABLE 3B.

TABLE 3B

Ranging parameters

| Name | Type | Valid ranging | Description |
|---|---|---|---|
| Ranging | Two Booleans | TRUE, FALSE | Indicates whether the ranging counter and the ranging bit of PHR are used or not. With a value of TRUE, the first boolean indicates that the ranging counter operation is enabled. With a value of FALSE, the first boolean indicates that the ranging counter operation is disabled. With a value of TRUE, the second boolean indicates that the Ranging Bit of PHR (if present) is set to one, and the frame is an RFRAME. With a value of FALSE, the second boolean indicates that the Ranging Bit of PHR (if present) is set to zero. |

The present disclosure does not preclude the option to separate two Booleans in the ranging parameter as two independent parameters, namely RangingCounterEnable and RangingPhrBit, in the MCPS-DATA.request. The following TABLE 3B illustrates the definitions of these two new parameters, which can be used to replace ranging in the MCPS-DATA.request.

TABLE 3C

New MCPS-DATA.request parameters to replace Ranging parameter

| Name | Type | Valid ranging | Description |
|---|---|---|---|
| RangingCounterEnable | Boolean | TRUE, FALSE | A value of TRUE indicates that the ranging counter operation is enabled. A value of FALSE indicates that the ranging counter operation is disabled. |

TABLE 3C-continued

New MCPS-DATA.request parameters to replace Ranging parameter

| Name | Type | Valid ranging | Description |
| --- | --- | --- | --- |
| RangingPhrBit | Boolean | TRUE, FALSE | A value of TRUE indicates that the Ranging Bit of PHR is set to one, and the frame is an RFRAME. A value of FALSE indicate that the Ranging Bit of PHR is set to zero. This parameter is used only when the PHR is present in a frame. |

The TxTime can have a proper time unit, e.g., the ranging counter time unit (RCTU) or the ranging scheduling time unit (RSTU) in the IEEE 802.15.4z. This disclosure does not constrain the time unit of the TxTime to be a specific one. In the current spec of IEEE 802.15.4z, TxTime is in the unit of RCTU. However, a control parameter can be introduced to specify the type of the TxTime. The control parameter, and the revised TxTime are illustrated in the TABLE 3D.

TABLE 3D

MCPS-DATA.request parameters: revised TxTime and new control parameter

| Name | Type | Valid ranging | Description |
| --- | --- | --- | --- |
| TxTimeType | Enumeration | NONE, RCTU_TIME, RSTU_TIME | This parameter specifies whether the TxTime parameter is used to control the time of transmission the frame. If TxTimeType is NONE, the transmission time is not specified by the TxTime. If a TxTimeType value is RCTU_TIME/RSTU_TIME, TxTime specifies the transmission time in the unit of RCTU/RSTU. |
| TxTime | Unsigned Integer | 0 to $2^{24} - 1$ | When TxTimeType RCTU_TIME, the transmit time is specified by TxTime in the time unit of the running ranging counter to give precise response time of the RMARKER. When TxTimeType = RSTU_TIME, the transmit time is specified by RangingTxTime is in RSTU to specify the start of the packet (preamble), which would be referenced to the time parameter of the most recent RCM as reported by the MCPS-DATA.indication that delivered it (or for a controller the MCPS-DATA.confirm that sent it). |

The TxTime presented in TABLE 3A and TABLE 3D has a size of 3-octet. However, other sizes of this parameter are not precluded by this disclosure.

In one embodiment, the MCPS-DATA.confirm primitive reports the results of a request to transfer data to another device. The semantics of the MCPS-DATA.confirm primitive are as follows. New parameters introduced by this disclosure are presented, while others are maintained the same as in IEEE standard specification.

MCP S-DATA.confirm (
 TxRrtiValueList,

-continued

AoaAzimuth,
 AoaElevation,
 AoaPresent,
 Rssi,
 Other parameters in the IEEE
 standard specification,
 )

TABLE 5

| | | | MCPS-DATA.confirm (Modified) |
|---|---|---|---|
| Name | Type | Valid range | Description |
| TxRrtiValueList | List of 32-bit integer | 0 to $2^{32} - 1$ | This reports the value(s) sent in the RRTI IE(s) where this was requested by the RequestRrtiTx parameter of the MCPS-DATA.request. |
| AoaAzimuth | Float | $-\pi$ to $+\pi$ | For an acknowledged transmission this is the AOA of the received signal in azimuth measured in radians, relative to some specific axis specified by an antenna arrangement or orientation. This parameter is valid only when the AoaPresent parameter is either AZIMUTH or BOTH. |
| AoaElevation | Float | $-\pi$ to $+\pi$ | For an acknowledged transmission this is the AOA of the received signal AOA of the received signal in elevation measured in radians. This parameter is valid only when the AoaPresent parameter is either ELEVATION or BOTH. |
| AoaPresent | Enumeration | NONE, BOTH, AZIMUTH, ELEVATION | This parameter indicates validity of AoaAzimuth and AoaElevation parameter. For a non-acknowledged transmission or where AOA is not supported this parameter value may be NONE. |
| Rssi | Integer | 0 to 255 | For an acknowledged transmission this reports the received signal strength for the Ack frame. This is a measure of the RF power level at the antenna based on the gain setting in the RX chain and the measured signal level in the channel. For the transmission of RFRAME, the RSSI value is measured during the frame preamble, and locked when a valid SFD is detected. A value of zero indicates that RSSI measurement is not supported or was not measured for this frame. |

TxRrtiValueList may not need to be used, since the next higher layer can also use the transmit time reported by the MCPS-DATA.confirm, along with the reception timestamps of RFRAMEs from different devices, to calculate reply times.

In one embodiment, to illustrate functionality of next higher layer via using the newly defined parameters in data primitives, message sequence charts are provided for multicast DS-TWR ranging with one ranging initiator and multiple ranging responders in FIG. 33 and FIG. 34.

In FIG. 33, the MAC layer is capable of storing timestamps of received RFRAMEs, and corresponding source addresses. Therefore, in the primitive of data request for the second polling message from the initiator, a next higher layer can use RequestRrtiTx to request a MAC layer insert-ing RRTI IE(s). A MAC layer can calculate reply times to different devices by using stored timestamps of received RFRAMEs and form corresponding RRTI IEs.

In FIG. 34, the MAC layer cannot store timestamps of received RFRAMEs, and corresponding source addresses. In the primitive of data request for the second polling message from the initiator, a next higher layer not only set RequestRrtiTx to be TRUE, but also convey addresses of ranging devices which requested reply time in RequestRrtiDevList, and timestamps of last received RFRAMEs from these devices in RecTimeList. Subsequently, a MAC layer is capable of calculating reply times to different devices by using timestamps of received RFRAMEs and form corresponding RRTI IEs.

In one embodiment, the ranging specific attributes of PIB is provided as illustrated in TABLE 6.

TABLE 6

| | | | |
|---|---|---|---|
| | Ranging specific MAC PIB attributes | | |
| Attribute | Type | Range | Description |
| macUWBrngAddressList | IEEE address | List of addresses | The address list of ranging devices which participate in the ranging round. |
| macUWBrngInitiatorList | List of enumerations | TRUE, FALSE | The list of enumerations to indicate the role of ranging devices. If TRUE, the ranging device is an initiator. If FALSE, the ranging device is a responder. The order of the list follows the same as that of macUWBrngAddressList. |

TABLE 6-continued

Ranging specific MAC PIB attributes

| Attribute | Type | Range | Description |
| --- | --- | --- | --- |
| macUWBrngCastMode | Enumeration | UNICAST, MULTICAST, BROADCAST, M2M | Indicates the cast mode of a ranging round, whether it is unicast between one initiator and one responder, or multicast/broadcast between one initiator and many responders, or M2M between many initiators and many responders. |
| macUWBrngMethod | Enumeration | OWR, SS-TWR, DS-TWR | Indicates the ranging method whether it is one-way ranging (OWR), single-sided two-way ranging (SS-TWR), or double-sided two-way ranging (DS-TWR). |
| macUWBrngScheduleEnabled | Boolean | TRUE, FALSE | If TRUE, the ranging devices are scheduled over ranging slots of one or more ranging rounds. If the scheduling-based ranging is disabled, this attributed may be set to FALSE. |
| macUWBrngDeferEnabled | Boolean | TRUE, FALSE | If TRUE, the deferred mode of ranging is enabled. Specifically, the exchange of IEs related to timestamps or AOA occurs at the end of a ranging round with one or more separate data frames. If FALSE, the deferred mode of ranging is disabled, and the IEs related to timestamps or AOA can be inserted in the transmitted ranging frames. |
| macUWBrngScheduleAssign | Bitmap | As defined in the content fields of RS IE | The attribute is present when macUWBrngScheduleEnabled is TRUE, which specifies the time slot allocation among ranging devices in one or more ranging rounds. |
| macUWBrngCPassign | Bitmap | As defined in the content fields of CP IE | The attribute is present when macUWBrngScheduleEnabled is FALSE, which indicates separate contention periods of one or more ranging rounds. |
| macUWBrngMaxRetry | Integer | 0x00-0xff | Indicates the maximum number of transmissions that a ranging device tries to contend for multiple contention-based ranging rounds. |
| macUWBrngNextChannel | Integer | 0-15 | Indicates the channel index of the next ranging block. |
| macUWBrngNextPre | Integer | 0-7 | Indicates the preamble code index of the next ranging block. |
| macUWBrngMinBlockLength | Integer | 0x0000-0xffff | The minimum ranging block length in the unit of minimum MAC time step. |
| macUWBrngBlockLength | Integer | 0x00-0xff | Specifies the number, multiplying the macUWBrngMinBlockLength, to determining the block length. If the integer number is zero, it indicates that the ranging block structure is disabled. |
| macUWBrngSlotLength | Integer | 0x0000-0xffff | The ranging slot length in the unit of minimum MAC time step. |
| macUWBrngRoundLength | Integer | 0x0000-0xffff | The ranging round length in the unit of macUWBrngSlotLength. |
| macUWBrngNhdPPDU | Boolean | TRUE, FALSE | If TRUE, the PPDU format without PHR and PHY payload as FIG. 24 (e.g., |

TABLE 6-continued

Ranging specific MAC PIB attributes

| Attribute | Type | Range | Description |
|---|---|---|---|
| | | | (c) in FIG. 24) exhibits is enabled for secure ranging. If FALSE, the PPDU format of as FIG. 24 (e.g., (c) in FIG. 24) is disabled. |
| macUWBrngBlockInterval | Integer | 0x0000-0xffff | The relative time difference in the unit of minimum MAC time step between the start of the next ranging block and the start of the current ranging round. |
| macUWBrngRoundInterval | Integer | 0x0000-0xffff | The relative time difference in the unit of minimum MAC time step between the start of the next ranging round and the start of the current ranging round. |
| maxUWBrngUpdateInterval | Integer | 0x0000-0xffff | Indicates the waiting time in the unit of minimum MAC time step for the controller to send the block interval and round interval again. |

The higher layer can read and set the value of ranging specific MAC PIB attributes, which can be used by the MAC sublayer to form corresponding IEs. For example, the higher layer determines the scheduling assignment by macUWBrngScheduleAssign, which may be used by the MAC sublayer to form the RS IE.

Some attributes in TABLE 6 are specified for ranging configuration as FIG. 26 and FIG. 29. TABLE 7 illustrates these attributes with modified semantics and descriptions and introduces some other required PIB attributes so that MAC sublayer is capable of fulfilling ranging configuration accordingly.

TABLE 7

Multi-node Ranging Specific MAC PIB attributes

| Attribute | Type | Range | Description | Default |
|---|---|---|---|---|
| macMultiRangingSupport | Boolean | FALSE, TRUE | Read only value indicating whether the device is able to configure multi-node ranging by a MAC sublayer. | Implementation dependent |
| MultiRangingEnable | Boolean | FALSE, TRUE | When set to TRUE, the MAC sublayer may use and insert an ARC IE in a data frame prior to sending it, where macMultiRangingSupport indicates that the device is capable of doing this. | FALSE |
| minRangingBlockLength | Integer | 0~ ($2^{24}$ − 1) | The minimum ranging block length is in the unit of ranging scheduling time unit (RSTU). | 14400 |
| macRangingBlockLength | Integer | 0-63 | Specifies the number, multiplying the minRangingBlockLength to determine the ranging block length. The default value is 0, which indicates that the multi-node ranging is disabled. | 0 |
| macRangingSlotLength | Integer | 0~ ($2^{16}$ − 1) | The ranging slot length is in the unit of RSTU. The default value is 0, which indicates that the multi-node ranging is disabled. | 0 |
| macRangingRoundLength | Integer | 0~ ($2^{24}$ − 1) | The ranging round length is in the unit of macRangingSlotLength. The default value is 0, which indicates that the multi-node ranging is disabled. | 0 |
| macMultiRangingMode | Integer | 0-2 | Indicates the multi-node ranging mode: a value of 0 indicates one initiator-to-one responder, a value of 1 | — |

TABLE 7-continued

Multi-node Ranging Specific MAC PIB attributes

| Attribute | Type | Range | Description | Default |
|---|---|---|---|---|
| | | | indicates one initiator-to-multiple responders, and a value of 2 indicates many initiators-to-many responders (M2M). | |
| macMultiRangingMethod | Enumeration | OWR, SS-TWR, DS-TWR | Indicates the ranging method whether it is one-way ranging (OWR), single-sided two-way ranging (SS-TWR), or double-sided two-way ranging (DS-TWR). | Implementation dependent |
| macMultiRangingSpConfig | Integer | 0-3 | Indicates the STS packet configuration of ranging transmission, see IEEE 802.15.4z. | Implementation dependent |
| macMultiRangingSchedule | Boolean | TRUE, FALSE | If TRUE, scheduling-based ranging is enabled. If the contention-based ranging is enabled, this attribute may be set to FALSE. | TRUE |
| macMultiRangingDefer | Boolean | TRUE, FALSE | If TRUE, the deferred mode of ranging is enabled. Ranging IEs related to reply time, AOA report are exchanged in the data frame(s) of measurement report phase (6.9.8.1). If FALSE, the deferred mode of ranging is disabled, and ranging IEs related to reply time, AOA report are inserted in the RFRAME. | Implementation dependent |
| macTimeStructure | Integer | 0, 1 | Indicates the time structure mode of multi-node ranging: a value of 0 denotes the interval-based structure (6.9.8.2.1), and a value of 1 denotes the block-based structure (6.9.8.2.2). | Implementation-dependent |
| activeRoundNumber | Integer | 0-63 | Number of active ranging rounds per ranging configuration. The default value is 0, which indicates that the multi-node ranging is disabled. | 0 |

Before the exchanges for ranging configuration, as part of ranging set-up activities, a ranging controller can adjust PIB attributes in TABLE 7 via MLME-SET.request primitives.

With MultiRangingEnable in the primitive MCPS-DATA.request, a next higher layer of controller can use it to command the MAC sublayer for fulfilling ranging configuration according to PIB attributes in TABLE 7.

MCPS-DATA.request ( MultiRangingEnable )

TABLE 8 8 illustrates the definition of MultiRangingEnable.

TABLE 8

MCPS-DATA.request parameter: MultiRangingEnable

| Name | Type | Valid range | Description |
|---|---|---|---|
| MultiRangingEnable | Boolean | TRUE, FALSE | TRUE if a MAC sublayer of a ranging controller is enabled for the configuration of multi-node/advanced ranging, FALSE otherwise. |

If MultiRangingEnable is TRUE, multi-node advanced ranging is enabled to be configured by a MAC sublayer of a ranging controller. According to MAC PIB attributes in TABLE 7, the MAC sublayer may attempt to create ARC IE, and insert it into the ranging control message (RCM) prior to sending it. The Status of SUCCESS in MCPS-DATA.confirm is reported to a next higher layer of a controller if the multi-node ranging is successfully configured, otherwise Status of UNSUPPORTED_RANGING is returned.

Figure 35:
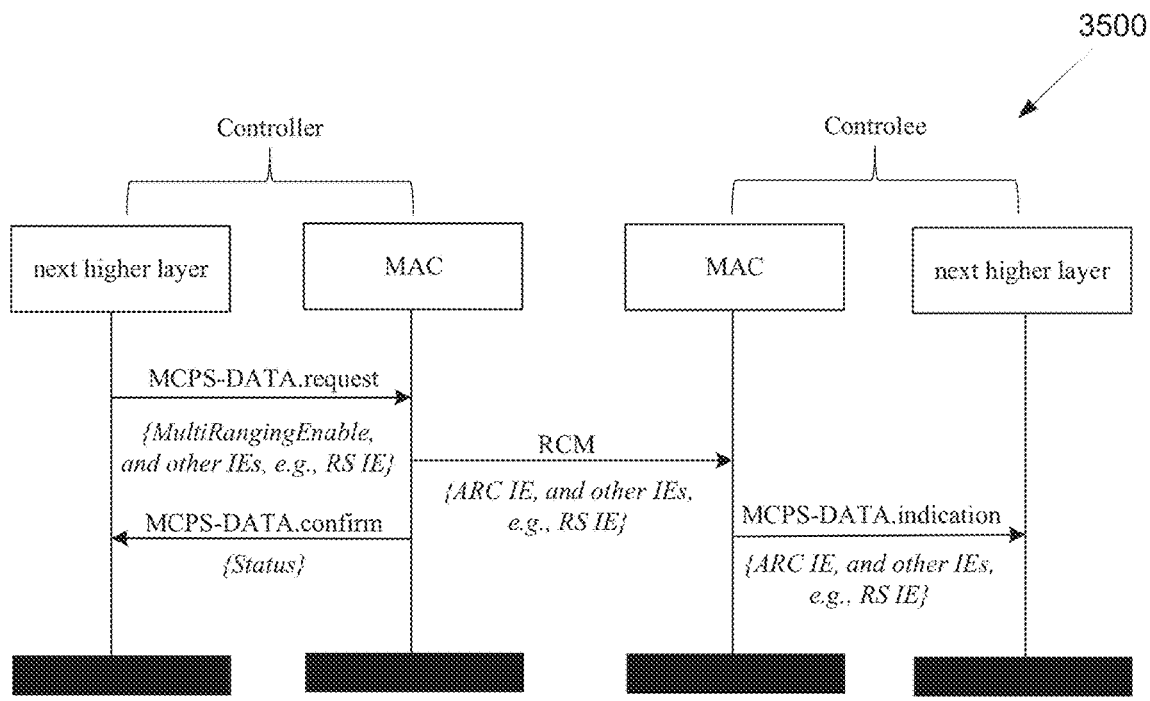
FIG. 35 illustrates an example message sequence chart for multi-node ranging configuration according to embodiments of the present disclosure.

FIG. 35 illustrates an example message sequence chart 3500 for multi-node ranging configuration according to embodiments of the present disclosure. The embodiment of the message sequence chart 3500 illustrated in FIG. 35 is for illustration only. FIG. 35 does not limit the scope of the present disclosure to any particular implementation.

As illustrated in FIG. 35, the controller and controlee may perform a function or functions of 111-116 and/or 101-103 as illustrated in FIG. 1. The controller and controlee may be one of nodes in a group 1 and/or group 2 as illustrated in FIG. 6. The controller and controlee may be the electronic device 501 as illustrated in FIG. 5.

A suggested message sequence chart for multi-node ranging configuration is illustrated in FIG. 35.

A next higher layer of a controller initiates MCPS-DATA.request with MultiRangingEnable setting to be TRUE, which enables the MAC sublayer to create ARC IE via MAC PIB attributes in TABLE 7 and insert it into RCM. Then, MCPS-DATA.confirm reports the status of ranging configuration back to a next higher layer of a controller, while MCPS-DATA.indication conveys ARC IE, and other IEs, e.g., RS IE for scheduling-based ranging, to next higher layer of controlee(s).

In one embodiment, interactions/procedures are provided to fulfill the ranging configuration via a MAC sublayer. To fulfill both ranging configuration and scheduling, E4 utilizes additional PIB attributes from TABLE 6, and introduces new parameters to MCPS-DATA.request.

TABLE 9 illustrates attributes related to ranging scheduling. Some of them are from TABLE 6 with modified semantics and descriptions. Additional PIB attributes are also introduced, so that a MAC sublayer is capable of fulfilling both ranging configuration and scheduling according to TABLE 7 and TABLE 9.

TABLE 9

Ranging scheduling specific MAC PIB attributes

| Attribute | Type | Range | Description | Default |
|---|---|---|---|---|
| macDevicePresence | Boolean | TRUE, FALSE | If TRUE, a ranging controller knows the identities controlees, FALSE otherwise. | FALSE |
| macUWBrngAddressList | IEEE address | List of addresses | The address list of ranging devices which participate in the ranging round. The default setting is NULL. This parameter has list address of controlee(s) only when macDevicePresence is TRUE. | NULL |
| MultiRangingSchedule | Boolean | TRUE, FALSE | TRUE if a MAC sublayer of a ranging controller is enabled for the configuration of multi-node/advanced scheduling-based ranging, FALSE otherwise. The default setting of this parameter is FALSE. This parameter can be TRUE only when macDevicePresence is TRUE. | FALSE |
| MultiRangingContention | Boolean | TRUE, FALSE | TRUE if a MAC sublayer of a ranging controller is enabled for the configuration of multi-node/advanced contention-based ranging, FALSE otherwise. The default setting of this parameter is FALSE. | FALSE |
| macUWBrngInitiatorList | List of enumerations | TRUE, FALSE | The list of enumerations to indicate the role of ranging devices. If TRUE, the ranging device is an initiator. If FALSE, the ranging device is a responder. The order of the list follows the same as that of macUWBrngAddressList. This parameter can be present only when macDevicePresence is TRUE and macUWBrngAddressList is not NULL. | FALSE |
| macUWBrngScheduleAssign | Bitmap | As defined in the content fields of RS IE | The attribute is present when macMultiRangingSchedule in TABLE 7 is TRUE, macDevicePresence is TRUE, and macUWBrngAddressList is not NULL. The attribute specifies the time slot allocation among ranging devices. | — |

TABLE 9-continued

Ranging scheduling specific MAC PIB attributes

| Attribute | Type | Range | Description | Default |
|---|---|---|---|---|
| macUWBrngCPassign | Bitmap | As defined in the content fields of RCPS IE | The attribute is present when macMultiRangingSchedule in TABLE 7 is FALSE, macDevicePresence is TRUE, and macUWBrngAddressList is not NULL. The attribute indicates separate contention periods/phases for RDEVs with different types to contend. | — |
| macUWBrngMaxRetry | Integer | 0-63 | Indicates the maximum number of transmissions that a ranging device tries to contend for multiple contention-based ranging rounds. The attribute is present when macMultiRangingSchedule in TABLE 7 is FALSE. A value may be less than activeRoundNumber in TABLE 7. The default setting is 1. | 1 |

Before the exchanges for ranging configuration, as part of ranging set-up activities, a ranging controller can adjust PIB attributes in TABLE 7 via MLME-SET.request primitives.

Instead of using MultiRangingEnable, S5 introduces MultiRangingSchedule and MultiRangingContention in the primitive MCPS-DATA.request to distinguish scheduling-based and contention-based multi-node advanced ranging, respectively. A next higher layer of a controller can use it to command the MAC sublayer for fulfilling ranging configuration and scheduling according to PIB attributes in TABLE 7 and TABLE 9.

```
MCPS-DATA.request    (
                     MultiRangingSchedule
                     MultiRangingContention
                     )
```

TABLE 10 illustrates the definition of MultiRangingSchedule and MultiRangingContention.

TABLE 10

MCPS-DATA.request parameter: MultiRangingSchedule & MultiRangingContention

| Name | Type | Valid range | Description |
|---|---|---|---|
| MultiRangingSchedule | Boolean | TRUE, FALSE | TRUE if a MAC sublayer of a ranging controller is enabled for the configuration of multi-node/advanced scheduling-based ranging, FALSE otherwise. |
| MultiRangingContention | Boolean | TRUE, FALSE | TRUE if a MAC sublayer of a ranging controller is enabled for the configuration of multi-node/advanced contention-based ranging, FALSE otherwise. |

If MultiRangingSchedule is TRUE, multi-node advanced scheduling-based ranging is enabled to be configured by a MAC sublayer of a ranging controller. According to MAC PIB attributes in TABLE 7 and TABLE 9, the MAC sublayer attempts to create ARC, RS IE, and insert them into the ranging control message (RCM) prior to sending it. The Status of SUCCESS in MCPS-DATA.confirm is reported to a next higher layer of a controller if the multi-node scheduling-based ranging is successfully configured, otherwise Status of UNSUPPORTED_RANGING is returned.

If MultiRangingContention is TRUE, multi-node advanced contention-based ranging is enabled to be configured by a MAC sublayer of a ranging controller. According to MAC PIB attributes in TABLE 7 and TABLE 9, the MAC sublayer attempts to create ARC IE, RIRL IE, RCPS IE, and insert them into the ranging control message (RCM) prior to sending it.

For contention-based ranging, if a ranging controller does not know the identities of ranging controlees, a MAC sublayer of the ranging controller can fulfill ranging configuration via ARC IE, but it is not capable of creating RIRL IE or RCPS IE. If a ranging controller knows the identities of ranging controlees, a MAC sublayer of the ranging controller can create RIRL IE to assign device type, i.e., ranging initiator or responder, to controlee, and use RCPS IE to configure contention phases of ranging round(s). The Status of SUCCESS in MCPS-DATA.confirm is reported to a next higher layer of a controller if the multi-node contention-based ranging is successfully configured, otherwise Status of UNSUPPORTED_RANGING is returned.

When a ranging controller initializes MCPS.DATA.request, if one of MultiRangingSchedule and MultiRanging- Contention is enabled with a TRUE value, the other one may have a FALSE value or be ignored from the MCPS.DATA.request.

Figure 36:
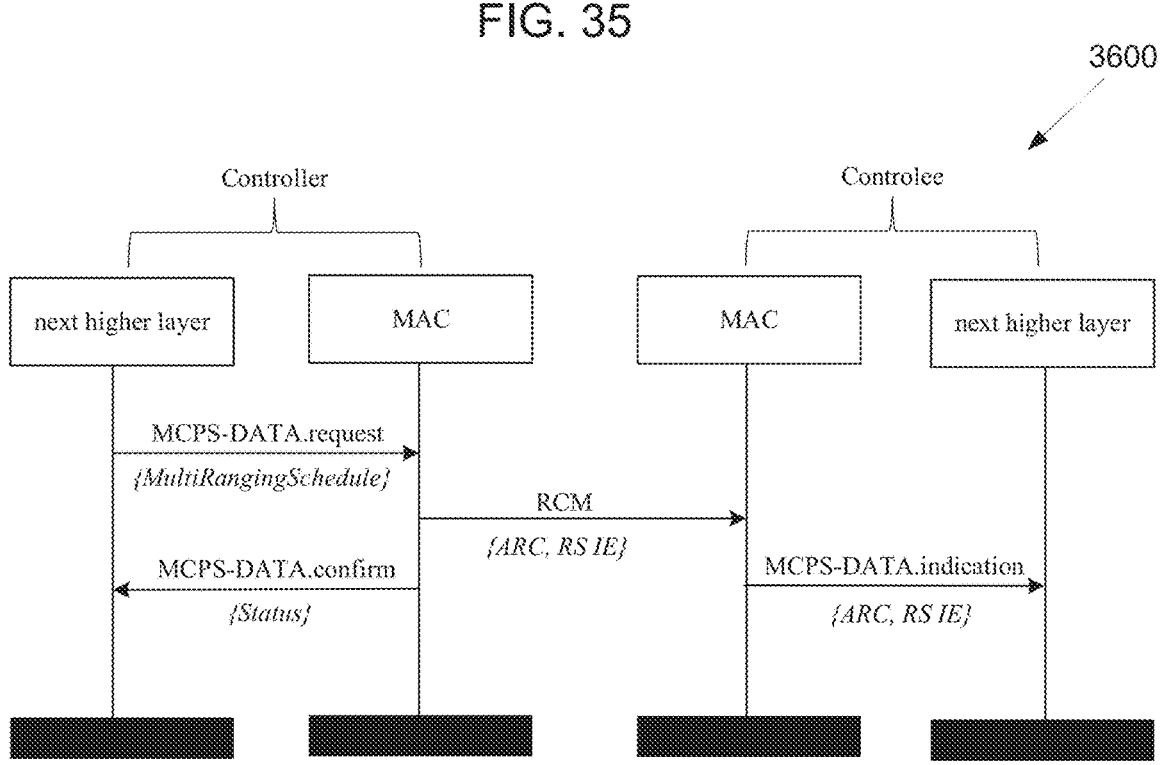
FIG. 36 illustrates an example message sequence chart for multi-node scheduling-based ranging configuration according to embodiments of the present disclosure.

FIG. 36 illustrates an example message sequence chart 3600 for multi-node scheduling-based ranging configuration according to embodiments of the present disclosure. The embodiment of the message sequence chart 3600 illustrated in FIG. 36 is for illustration only. FIG. 36 does not limit the scope of the present disclosure to any particular implementation.

As illustrated in FIG. 36, the controller and controlee may perform a function or functions of 111-116 and/or 101-103 as illustrated in FIG. 1. The controller and controlee may be one of nodes in a group 1 and/or group 2 as illustrated in FIG. 6. The controller and controlee may be the electronic device 501 as illustrated in FIG. 5.

FIG. 36 illustrates an example of message sequence chart for multi-node scheduling-based ranging configuration. A next higher layer initializes MCPS-DATA.request with MultiRangingSchedule to enable a MAC sublayer for fulfilling advanced scheduling-based ranging configuration. With a value of TRUE, MultiRangingSchedule triggers the MAC sublayer to create and insert ARC, RS IE into RCM prior to sending it.

To form the ARC IE, a controller's MAC sublayer can use the PIB attributes specified in TABLE 7, which is adjusted by a next higher layer before the ranging configuration starts. To form the RS IE, a controller's MAC sublayer can use attribute macUWBrngScheduleAssign in TABLE 9. Then, MCPS-DATA.confirm reports the Status of ranging configuration back to a next higher layer of a controller, while MCPS-DATA.indication conveys ARC, RS IE to a next higher layer of controlee(s).

Figure 37:
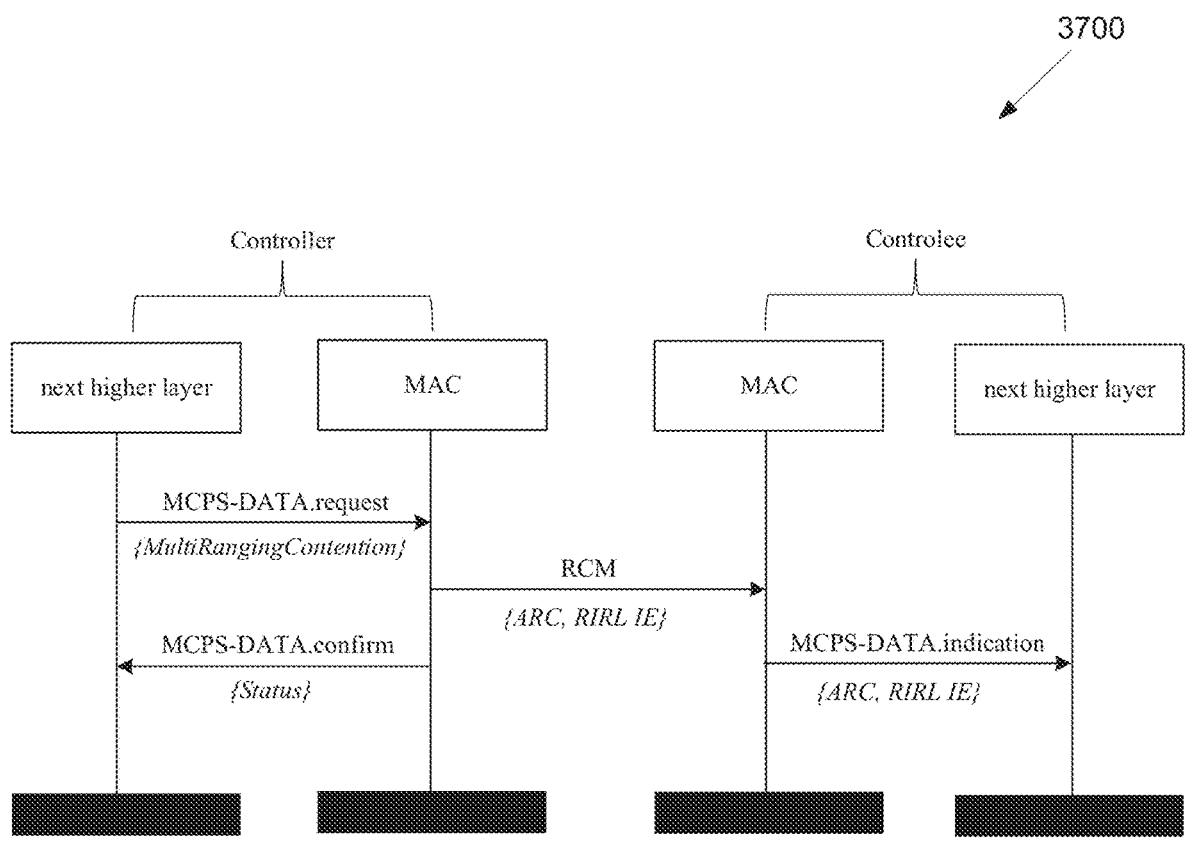
FIG. 37 illustrates an example message sequence chart for multi-node contention-based ranging configuration according to embodiments of the present disclosure.

FIG. 37 illustrates an example message sequence chart 3700 for multi-node contention-based ranging configuration according to embodiments of the present disclosure. The embodiment of the message sequence chart 3700 illustrated in FIG. 37 is for illustration only. FIG. 37 does not limit the scope of the present disclosure to any particular implementation.

As illustrated in FIG. 37, the controller and controlee may perform a function or functions of 111-116 and/or 101-103 as illustrated in FIG. 1. The controller and controlee may be one of nodes in a group 1 and/or group 2 as illustrated in FIG. 6. The controller and controlee may be the electronic device 501 as illustrated in FIG. 5.

FIG. 37 illustrates an example of message sequence chart for multi-node contention-based ranging configuration. A next higher layer initializes MCPS-DATA.request with MultiRangingContention to enable a MAC sublayer for fulfilling advanced contention-based ranging configuration. With a value of TRUE, MultiRangingContention triggers the MAC sublayer to create and insert ARC IE into RCM prior to sending it. To form some other IEs related to contention-based ranging, e.g., RCPS, RIRL IE, need macDevicePresence to be TRUE, and macUWBrngAddressList is not NULL in TABLE 9.

To form the ARC IE, a controller's MAC sublayer can use the PIB attributes specified in TABLE 7, which is adjusted by a next higher layer before the ranging configuration starts. To form the RIRL IE, a controller's MAC sublayer can use attribute macUWBrngInitiatorList and macUWBrngAddressList in TABLE 9. To form the RCPS IE, a controller's MAC sublayer can use attribute macUWBrngCPassign in TABLE 9.

Then, MCPS-DATA.confirm reports the status of ranging configuration back to a next higher layer of a controller, while MCPS-DATA.indication conveys ARC, RIRL, and/or RCPS IE to a next higher layer of controlee(s).

In one embodiment, two timestamps in the unit of RSTU, respectively for transmission and reception of frame, are introduced to the primitives of MCPS-DATA.confirm and MCPS-DATA.indication.

The newly introduced timestamp parameters are specified below for the MCPS-DATA.confirm.

MCPS-DATA.confirm (
  TxRstuCounter,
  RxRstuCounter,
)

TABLE 11

MCPS-DATA.confirm parameters: timestamps in the unit of RSTU

| Name | Type | Valid range | Description |
| --- | --- | --- | --- |
| TxRstuCounter | Unsigned Integer | 0x0000000000-0xffffffffff | A count of the time units corresponding to the start of the transmitted packet (preamble), which would be referenced to the time parameter of the most recent RCM as reported by the MCPS-DATA.indication that delivered it (or for a controller the MCPS-DATA.confirm that sent it). The unit of time is RSTU. |
| RxRstuCounter | Unsigned Integer | 0x0000000000-0xffffffffff | A count of the time units corresponding to the start of the received packet (preamble), which would be referenced to the time parameter of the most recent RCM as reported by the MCPS-DATA.indication that delivered it (or for a controller the MCPS-DATA.confirm that sent it). The unit of time is RSTU. |

The newly introduced timestamp parameters are specified below for the MCPS-DATA.indication.

MCPS-DATA.indication (
  TxRstuCounter,
  RxRstuCounter,
)

TABLE 12

MCPS-DATA.indication parameters: timestamps in the unit of RSTU

| Name | Type | Valid range | Description |
| --- | --- | --- | --- |
| TxRstuCounter | Unsigned Integer | 0x0000000000-0xffffffffff | A count of the time units corresponding to the start of the transmitted packet (preamble), which would be referenced to the time parameter of the most recent RCM as reported by the MCPS-DATA.indication that delivered it (or for a controller the MCPS-DATA.confirm that sent it). The units of time are specified in IEEE standard specification. |
| RxRstuCounter | Unsigned Integer | 0x0000000000-0xffffffffff | A count of the time units corresponding to the start of the received packet (preamble), which would be referenced to the time parameter of the most recent RCM as reported by the MCPS-DATA.indication that delivered it (or for a controller the MCPS-DATA.confirm that sent it). The units of time are specified in IEEE standard specification. |

There is an existed Timestamp parameter in the MCPS-DATA.confirm and MCPS-DATA.indication, which can also be used to indicate the reception time in the unit of RSTU if the multi-node ranging scheme is used. This option is not precluded by this disclosure. Other proper sizes of TxRstuCounter and RxRstuCounter are not precluded by this disclosure.

Figure 38:
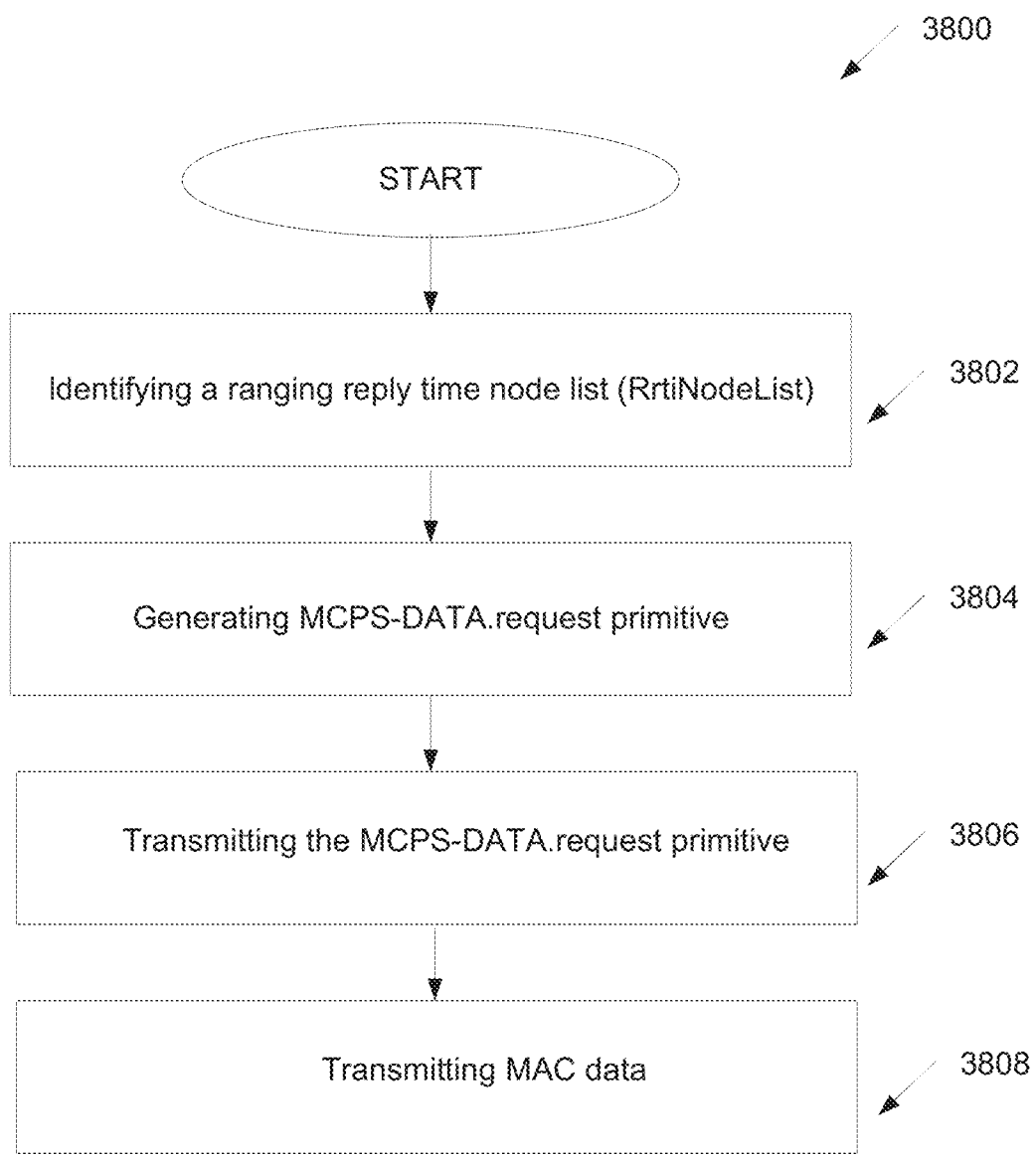
FIG. 38 illustrates a flowchart of a method for secure ranging operation according to embodiments of the present disclosure.

FIG. 38 illustrates a flowchart of a method 3800 for secure ranging operation according to embodiments of the present disclosure, as may be performed by an electronic device (e.g., 111-116 and/or 101-103 as illustrated in FIG. 1). In one embodiment, the electronic device may be a network entity. The embodiment of the method 3800 illustrated in FIG. 38 is for illustration only. FIG. 38 does not limit the scope of the present disclosure to any particular implementation.

In one embodiment, a controller and controlee, as a network entity, that may be one of nodes in a group 1 and/or group 2 as illustrated in FIG. 6 may perform the method 3800. In one embodiment, an initiator and responder may perform the method 3800.

As illustrated in FIG. 38, the method 3800 begins at step 3802. In step 3802, a network entity (e.g., electronic device) identifies, by a higher layer of the network entity, a ranging reply time node list (RrtiNodeList) indicating a list of neighbor network entities for which ranging reply time instantaneous information elements (RRTI IEs) are requested along with receive ranging counter values.

In one embodiment, in step 3802, the RrtiNodeList comprising a request ranging reply time device list (RequestRrtiDevList) and a receive time list (RecTimeList) indicates the MAC sublayer to form the RRTI IEs for reply time reports; the RequestRrtiDevList comprises a list of range device address that is either a length of 2 byte short address or a length of 8 byte extended address; and the RecTimeList comprises a list of timestamps each of which comprises a length of 32 bits to indicate a value between 0 and $2^{32}-1$.

Subsequently, in step 3804, the network entity generates, by the higher layer of the network entity, a medium access control (MAC) common part sublayer (CPS) data request (MCPS-DATA.request) primitive including the RrtiNodeList.

Next, in step 3806, the network entity transmits, to a MAC layer of the network entity, the generated MCPS-DATA.request primitive.

Finally, in step 3808, the network entity transmits, to another network entity in the list of neighboring network entities, MAC data including ranging information, the RRTI, and ranging measurement information IEs (RMI IEs), wherein the MAC layer of the network entity is further configured to transmit, to the higher layer of the network entity, an MCPS-DATA.confirm primitive.

In one embodiment, the network entity determines address/ranging counter pairs from the RrtiNodeList parameter; inserts, by the MAC layer of the network entity, the RRTI IEs, based on the address/ranging counter pairs, into a frame when the RequestRrtiTx parameter is set to a non-zero value and the MAC layer of the network entity is capable of generating the RRTI IEs; and transmits, to the other network entity in the list of neighboring network entities, the frame including the RRTI IEs.

In one embodiment, the network entity calculates a value of RX-to-TX reply time field based on a difference between a RMARKER timestamp of the transmitted frame and a corresponding receive ranging counter value from the RrtiNodeList, wherein an address of each RRTI list field corresponds to an address of the RrtiNodeList.

In one embodiment, the network entity identifies, for a ranging device (RDEV), a Ranging field determining whether a ranging counter is set to a TRUE or a FALSE, the TRUE indicating that the ranging counter is enabled and the FALSE indicating that the ranging counter is disabled; identifies a ranging physical header (RangingPhr) field determining whether a ranging bit of physical layer header (PHR) is set to a TRUE or a FALSE, the TRUE indicating that the ranging bit of PHR is set to one and the FALSE indicating that the ranging bit of PHR is not set to one; and generates the MCPS-DATA.request primitive including the Ranging field and the RangingPhr field.

In one embodiment, the network entity identifies a transmit time specified (TxTimeSpecified) field determining a use of a ranging transmit time (RangingTxTime) parameter, (i) if TxTimeSpecified value is set to a NONE, the RangingTxTime is not used, (ii) if TxTimeSpecified value is set to a ranging counter time unit (RCTU_TIME), the RangingTxTime specifies a transmission time of a frame in a unit of RCTU, and (iii) if TxTimeSpecified value is set to a ranging scheduling time unit (RSTU_TIME), the RangingTxTime specifies the transmission time of the frame in a unit of RSTU; identifies the RangingTxTime field to specify the transmission time of the frame, the RangingTxTime field being set between 0x00000000 and 0xffffffff; and generates he MCPS-DATA.request primitive including the TxTimeSpecified field and the RangingTxTime field.

In such embodiment, the RangingTxTime parameter indicates an RMARKER transmit time when the TxTimeSpecified field is set to the RCTU_TIME; the RangingTxTime parameter indicates a transmission start time of a packet when the TxTimeSpecified field is set to the RSTU_TIME; and the RangingTxTime parameter is not used when the TxTimeSpecified field is set to the NONE.

In one embodiment, the network entity receives, from the MAC layer of the network entity, an MCPS-DATA.confirm primitive including an angle of arrival Azimuth (AngleOfArrivalAzimuth) field with a value between −π to +π, an angle of arrival elevation (AngleOfArrivalElevation) field with a value between −π to +π, and an angle of arrival present (AngleOfArrivalPresent) field that is set to a NONE, a BOTH, a AZIMUTH, or an ELEVATION, In such embodiment, the AngleOfArrival Azimuth field indicates an angle of arrival (AOA) is placed in radians of received signal in Azimuth for a reception of an acknowledgement (ACK) frame when the AngleOfArrivalPresent field is set to the AZIMUTH or the BOTH; the AngleOfArrivalElevation field indicates the AOA is placed in radians of the received signal in elevation for the reception of the ACK frame when the AngleOfArrivalPresent field is set to the ELEVATION or the BOTH; and the AngleOfArrivalPresent field indicates a validity of the AngleOfArrivalAzimuth field and the AngleOfArrivalElevation field.

In one embodiment, the network entity receives, from the MAC layer of the network entity, an MCPS-DATA.confirm primitive including a time stamp (Timestamp) field with a value between 0x000000-0xffffff, wherein the Timestamp field, for an enhanced ranging device (ERDEV), is set to an RSTU_TIME corresponding to a start time of a packet including a preamble.

In one embodiment, the network entity receives, from the MAC layer of the network entity, an MCPS-DATA.indication primitive including a Timestamp field with a value between 0x000000-0xffffff for an ERDEV.

In such embodiment, the Timestamp field is set in the RSTU_TIME corresponding to a transmission start time of a packet including a preamble.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope

What is claimed is:

1. A network entity in a wireless communication system supporting ranging capability, the network entity comprising:
a processor configured to:
identify, by a higher layer of the network entity, a ranging reply time node list (RrtiNodeList) indicating a list of neighbor network entities for which ranging reply time instantaneous information elements (RRTI IEs) are requested along with receive ranging counter values;
generate, by the higher layer of the network entity, a medium access control (MAC) common part sublayer (CPS) data request (MCPS-DATA.request) primitive including the RrtiNodeList;
transmit, to a MAC layer of the network entity, the generated MCPS-DATA.request primitive; and a transceiver operably connected to the processor, the transceiver configured to:
transmit, to another network entity in the list of neighboring network entities, MAC data including ranging information, the RRTI IEs, and ranging measurement information IEs (RMI IEs),
wherein the MAC layer of the network entity is further configured to transmit, to the higher layer of the network entity, an MCPS-DATA.confirm primitive.

2. The network entity of claim 1, wherein:
the RrtiNodeList comprising a request ranging reply time device list (RequestRrtiDevList) and a receive time list (RecTimeList) indicates the MAC sublayer to form the RRTI IEs for reply time reports;
the RequestRrtiDevList comprises a list of range device addresses that is either a length of 2 byte short address or a length of 8 byte extended address; and
the RecTimeList comprises a list of timestamps each of which comprises a length of 32 bits to indicate a value between 0 and $2^{32}-1$.

3. The network entity of claim 2, wherein:
the processor is further configured to:
determine address/ranging counter pairs from the RrtiNodeList parameter; and
insert, by the MAC layer of the network entity, the RRTI IEs, based on the address/ranging counter pairs, into a frame when a RequestRrtiTx parameter is set to a non-zero value and the MAC layer of the network entity is capable of generating the RRTI IEs; and
the transceiver is further configured to transmit, to the other network entity in the list of neighboring network entities, the frame including the RRTI IEs.

4. The network entity of claim 3, wherein:
the processor is further configured to calculate a value of RX-to-TX reply time field based on a difference between a RMARKER timestamp of the transmitted frame and a corresponding receive ranging counter value from the RrtiNodeList; and
an address of each RRTI list field corresponds to an address of the RrtiNodeList.

5. The network entity of claim 1, wherein the processor is further configured to:
identify, for a ranging device (RDEV), a Ranging field determining whether a ranging counter is set to a TRUE value or a FALSE value, the TRUE value indicating that the ranging counter is enabled and the FALSE value indicating that the ranging counter is disabled;
identify a ranging physical header (RangingPhr) field determining whether a ranging bit of a physical layer header (PHR) is set to a TRUE value or a FALSE value, the TRUE value indicating that the ranging bit of the PHR is set to one and the FALSE value indicating that the ranging bit of the PHR is not set to one; and
generate the MCPS-DATA.request primitive including the Ranging field and the RangingPhr field.

6. The network entity of claim 1, wherein the processor is further configured to:
identify a transmit time specified (TxTimeSpecified) field determining a use of a ranging transmit time (RangingTxTime) parameter, (i) if TxTimeSpecified value is set to a NONE value, the RangingTxTime is not used, (ii) if TxTimeSpecified value is set to a ranging counter time unit (RCTU_TIME), the RangingTxTime specifies a transmission time of a frame in a unit of RCTU, and (iii) if TxTimeSpecified value is set to a ranging scheduling time unit (RSTU_TIME), the RangingTxTime specifies the transmission time of the frame in a unit of RSTU;

identify the RangingTxTime field to specify the transmission time of the frame, the RangingTxTime field being set between 0x00000000 and 0xffffffff; and generate the MCPS-DATA.request primitive including the TxTimeSpecified field and the RangingTxTime field.

7. The network entity of claim 6, wherein:

the RangingTxTime parameter indicates an RMARKER transmit time when the TxTimeSpecified field is set to the RCTU_TIME;

the RangingTxTime parameter indicates a transmission start time of a packet when the TxTimeSpecified field is set to the RSTU_TIME; and the RangingTxTime parameter is not used when the TxTimeSpecified field is set to the NONE value.

8. The network entity of claim 1, wherein:

the transceiver is further configured to receive, from the MAC layer of the network entity, an MCPS-DATA.confirm primitive including an angle of arrival Azimuth (AngleOfArrivalAzimuth) field with a value between $-\pi$ to $+\pi$, an angle of arrival elevation (AngleOfArrivalElevation) field with a value between $-\pi$ to $+\pi$, and an angle of arrival present (AngleOfArrivalPresent) field that is set to a NONE value, a BOTH value, an AZIMUTH value, or an ELEVATION value;

the AngleOfArrival Azimuth field indicates an angle of arrival (AOA) is placed in radians of received signal in Azimuth for a reception of an acknowledgement (ACK) frame when the AngleOfArrivalPresent field is set to the AZIMUTH value or the BOTH value;

the AngleOfArrivalElevation field indicates the AOA is placed in radians of the received signal in elevation for the reception of the ACK frame when the AngleOfArrivalPresent field is set to the ELEVATION value or the BOTH value; and the AngleOfArrivalPresent field indicates a validity of the AngleOfArrivalAzimuth field and the AngleOfArrivalElevation field.

9. The network entity of claim 8, wherein:

the processor is further configured to receive, from the MAC layer of the network entity, an MCPS-DATA.confirm primitive including a time stamp (Timestamp) field with a value between 0x000000-0xffffff; and the Timestamp field, for an enhanced ranging device (ERDEV), is set to an RSTU_TIME corresponding to a start time of a packet including a preamble.

10. The network entity of claim 1, wherein:

the processor is further configured to receive, from the MAC layer of the network entity, an MCPS-DATA.indication primitive including a Timestamp field with a value between 0x000000-0xffffff for an enhanced ranging device (ERDEV); and the Timestamp field is set in an RSTU_TIME corresponding to a transmission start time of a packet including a preamble.

11. A method of a network entity in a wireless communication system supporting ranging capability, the method comprising:

identifying, by a higher layer of the network entity, a ranging reply time node list (RrtiNodeList) indicating a list of neighbor network entities for which ranging reply time instantaneous information elements (RRTI IEs) are requested along with receive ranging counter values;

generating, by the higher layer of the network entity, a medium access control (MAC) common part sublayer (CPS) data request (MCPS-DATA.request) primitive including the RrtiNodeList;

transmitting, to a MAC layer of the network entity, the generated MCPS-DATA.request primitive; and transmitting, to another network entity in the list of neighboring network entities, MAC data including ranging information, the RRTI IEs, and ranging measurement information IEs (RMI IEs), wherein the MAC layer of the network entity is further configured to transmit, to the higher layer of the network entity, an MCPS-DATA.confirm primitive.

12. The method of claim 11, wherein:

the RrtiNodeList comprising a request ranging reply time device list (RequestRrtiDevList) and a receive time list (RecTimeList) indicates the MAC sublayer to form the RRTI IEs for reply time reports;

the RequestRrtiDevList comprises a list of range device addresses that is either a length of 2 byte short address or a length of 8 byte extended address; and the RecTimeList comprises a list of timestamps each of which comprises a length of 32 bits to indicate a value between 0 and $2^{32}-1$.

13. The method of claim 12, further comprising:

determining address/ranging counter pairs from the RrtiNodeList parameter;

inserting, by the MAC layer of the network entity, the RRTI IEs, based on the address/ranging counter pairs, into a frame when a RequestRrtiTx parameter is set to a non-zero value and the MAC layer of the network entity is capable of generating the RRTI IEs; and transmitting, to the other network entity in the list of neighboring network entities, the frame including the RRTI IEs.

14. The method of claim 13, further comprising calculating a value of RX-to-TX reply time field based on a difference between a RMARKER timestamp of the transmitted frame and a corresponding receive ranging counter value from the RrtiNodeList, wherein an address of each RRTI list field corresponds to an address of the RrtiNodeList.

15. The method of claim 11, further comprising:

identifying, for a ranging device (RDEV), a Ranging field determining whether a ranging counter is set to a TRUE value or a FALSE value, the TRUE value indicating that the ranging counter is enabled and the FALSE value indicating that the ranging counter is disabled;

identifying a ranging physical header (RangingPhr) field determining whether a ranging bit of a physical layer header (PHR) is set to a TRUE value or a FALSE value, the TRUE value indicating that the ranging bit of the PHR is set to one and the FALSE value indicating that the ranging bit of the PHR is not set to one; and generating the MCPS-DATA.request primitive including the Ranging field and the RangingPhr field.

16. The method of claim 11, further comprising:

identifying a transmit time specified (TxTimeSpecified) field determining a use of a ranging transmit time (RangingTxTime) parameter, (i) if TxTimeSpecified value is set to a NONE value, the RangingTxTime is not used, (ii) if TxTimeSpecified value is set to a ranging counter time unit (RCTU_TIME), the RangingTxTime specifies a transmission time of a frame in a unit of RCTU, and (iii) if TxTimeSpecified value is set to a ranging scheduling time unit (RSTU_TIME), the RangingTxTime specifies the transmission time of the frame in a unit of RSTU;

identifying the RangingTxTime field to specify the transmission time of the frame, the RangingTxTime field being set between 0x00000000 and 0xffffffff; and generating the MCPS-DATA.request primitive including the TxTimeSpecified field and the RangingTxTime field.

17. The method of claim 16, wherein:
the RangingTxTime parameter indicates an RMARKER transmit time when the TxTimeSpecified field is set to the RCTU_TIME;
the RangingTxTime parameter indicates a transmission start time of a packet when the TxTimeSpecified field is set to the RSTU_TIME; and
the RangingTxTime parameter is not used when the TxTimeSpecified field is set to the NONE value.

18. The method of claim 11, further comprising receiving, from the MAC layer of the network entity, an MCPS-DATA.confirm primitive including an angle of arrival Azimuth (AngleOfArrivalAzimuth) field with a value between $-\pi$ to $+\pi$, an angle of arrival elevation (AngleOfArrivalElevation) field with a value between $-\pi$ to $+\pi$, and an angle of arrival present (AngleOfArrivalPresent) field that is set to a NONE value, a BOTH value, an AZIMUTH value, or an ELEVATION value, wherein:
the AngleOfArrival Azimuth field indicates an angle of arrival (AOA) is placed in radians of received signal in Azimuth for a reception of an acknowledgement (ACK) frame when the AngleOfArrivalPresent field is set to the AZIMUTH value or the BOTH value;

the AngleOfArrivalElevation field indicates the AOA is placed in radians of the received signal in elevation for the reception of the ACK frame when the AngleOfArrivalPresent field is set to the ELEVATION value or the BOTH value; and the AngleOfArrivalPresent field indicates a validity of the AngleOfArrivalAzimuth field and the AngleOfArrivalElevation field.

19. The method of claim 18, further comprising receiving, from the MAC layer of the network entity, an MCPS-DATA.confirm primitive including a time stamp (Timestamp) field with a value between 0x000000-0xffffff, wherein the Timestamp field, for an enhanced ranging device (ERDEV), is set to an RSTU_TIME corresponding to a start time of a packet including a preamble.

20. The method of claim 11, further comprising receiving, from the MAC layer of the network entity, an MCPS-DATA.indication primitive including a Timestamp field with a value between 0x000000-0xffffff for an enhanced ranging device (ERDEV), wherein the Timestamp field is set in an RSTU_TIME corresponding to a transmission start time of a packet including a preamble.

* * * * *